US012780162B2

(12) United States Patent
Izumi et al.

(10) Patent No.: US 12,780,162 B2
(45) Date of Patent: Nov. 3, 2026

(54) DRIVING ASSIST APPARATUS, DRIVING ASSIST METHOD AND PROGRAM THEREFOR

(71) Applicants: DENSO CORPORATION, Kariya-city (JP); TOYOTA JIDOSHA KABUSHIKI KAISHA, Toyota (JP); J-QuAD DYNAMICS Inc., Tokyo (JP)

(72) Inventors: Yusuke Izumi, Tokyo (JP); Koichi Tsuchiya, Ebina (JP)

(73) Assignees: DENSO CORPORATION, Kariya-city (JP); TOYOTA JIDOSHA KABUSHIKI KAISHA, Toyota (JP); J-QuAD DYNAMICS Inc., Tokyo (JP)

( * ) Notice: Subject to any disclaimer, the term of this patent is extended or adjusted under 35 U.S.C. 154(b) by 0 days.

(21) Appl. No.: 19/089,804

(22) Filed: Mar. 25, 2025

(65) Prior Publication Data

US 2025/0304023 A1 Oct. 2, 2025

(30) Foreign Application Priority Data

Mar. 27, 2024 (JP) ................................ 2024-051982

(51) Int. Cl.
*B60T 8/58* (2006.01)
*B60T 8/171* (2006.01)
*B60T 8/172* (2006.01)

(52) U.S. Cl.
CPC ................ *B60T 8/58* (2013.01); *B60T 8/171* (2013.01); *B60T 8/172* (2013.01);
(Continued)

(58) Field of Classification Search
CPC . B60T 8/58; B60T 8/171; B60T 8/172; B60T 2201/022; B60T 2210/30; B60T 2250/04
(Continued)

(56) References Cited

U.S. PATENT DOCUMENTS

2010/0030474 A1 2/2010 Sawada
2013/0166150 A1* 6/2013 Han ...................... B60W 10/18 701/41

(Continued)

FOREIGN PATENT DOCUMENTS

JP 2010-030513 A 2/2010
JP 2024-050120 A 4/2024
JP 2025-131106 A 9/2025

OTHER PUBLICATIONS

Narita, Lateral position detection using side looking line sensor cameras, Jun. 11, 2003, IEEE, IEEE IV2003 Intelligent Vehicles Symposium (Year: 2003).*

*Primary Examiner* — Matthias S Weisfeld
(74) *Attorney, Agent, or Firm* — Precision Patents, P.C.

(57) ABSTRACT

A driving assist apparatus includes an acquiring unit that acquires information obtained by sensors and information related to an own vehicle; and an assist unit that performs a driving assist operation of the own vehicle, based on a sensor that detects an intersecting object and a yaw rate of the intersecting object, in which the assist unit executes a first braking control that brakes the own vehicle in the case where the yaw rate of the intersecting object is within a predetermined range and the sensor that detects the intersecting object is at least a front sensor; and executes a second braking control that brakes the own vehicle with a braking force smaller than that of the first braking control in the case where the yaw rate of the intersecting object is within a predetermined range and the sensor that detects the intersecting object is only a lateral sensor.

6 Claims, 14 Drawing Sheets

(52) U.S. Cl.
CPC ..... *B60T 2201/022* (2013.01); *B60T 2210/30* (2013.01); *B60T 2250/04* (2013.01)

(58) Field of Classification Search
USPC ........................................................... 701/96
See application file for complete search history.

(56) References Cited

U.S. PATENT DOCUMENTS

| | | | | |
|---|---|---|---|---|
| 2016/0052515 | A1* | 2/2016 | Choi ................ | B60W 30/0956 701/1 |
| 2020/0180611 | A1* | 6/2020 | Klingemann .......... | B60Q 9/008 |
| 2022/0063655 | A1* | 3/2022 | Clasen .................. | G01S 13/878 |
| 2024/0109522 | A1 | 4/2024 | Kobayashi et al. | |

* cited by examiner

DRIVING ASSIST APPARATUS, DRIVING ASSIST METHOD AND PROGRAM THEREFOR

CROSS-REFERENCE OF RELATED APPLICATIONS

The present application is based on Japanese Application No. 2024-051982 filed on Mar. 27, 2024, the content of which is incorporated herein by reference.

BACKGROUND

Technical Field

The present disclosure relates to a driving assist apparatus, a driving assist method and a program therefor.

Description of the Related Art

As conventional art, a driving assist apparatus is known in which a driving assist operation is performed for the driver by detecting an environment around the own vehicle. According to such a driving assist apparatus, an obstacle determination unit, a driving assist setting unit are provided. The obstacle determination unit detects an obstacle outside the own vehicle, and recognizes a first obstacle which can be visibly recognized by the driver of the own vehicle and a second obstacle which cannot be visibly recognized by the driver of the own vehicle. The driving assist setting unit is configured to evaluate a collision risk with the second obstacle to be higher than a collision risk with the first obstacle and sets the driving support control for collision avoidance with the respective obstacles.

SUMMARY

A first aspect of the present disclosure is a driving assist apparatus including: an acquiring unit that acquires information obtained by a front sensor that detects an object existing ahead of an own vehicle, information obtained by a lateral sensor that detects an object existing in a lateral side of the own vehicle and information related to the own vehicle; and an assist unit that performs a driving assist operation of the own vehicle, based on a sensor that detects an intersecting object as a moving object of which a trajectory intersects a trajectory of the own vehicle and a yaw rate of the intersecting object, in which the assist unit is configured to execute a first braking control that brakes the own vehicle in the case where the yaw rate of the intersecting object is within a predetermined range and the sensor that detects the intersecting object is at least the front sensor; and execute a second braking control that brakes the own vehicle with a braking force smaller than that of the first braking control in the case where the yaw rate of the intersecting object is within a predetermined range and the sensor that detects the intersecting object is only the lateral sensor.

DETAILED DESCRIPTION OF THE PREFERRED EMBODIMENT

As conventional art, for example, JP-A-2010-30513 discloses a driving assist apparatus in which a driving assist operation is performed for the driver by detecting an environment around the own vehicle. According to such a driving assist apparatus, an obstacle determination unit, a driving assist setting unit are provided. The obstacle determination unit detects an obstacle existing outside the own vehicle, and recognizes a first obstacle which can be visibly recognized by the driver of the own vehicle and a second obstacle which cannot be visibly recognized by the driver of the own vehicle. The driving assist setting unit is configured to evaluate a collision risk with the second obstacle to be higher than a collision risk with the first obstacle and sets the driving support control for collision avoidance with the respective obstacles. Also, in the driving assist operation, an alert operation is performed using a sound or a display, a forcible braking is performed by an automatic braking control apparatus and a steering avoidance is performed by an automatic steering apparatus.

In the case where a forcible braking is performed by the driving assist apparatus to avoid collision according to the above-described patent literature, since the driver of the own vehicle suddenly feels an inertia force caused by a deceleration of the own vehicle, the driver possibly feels that the forcible braking is unnecessary.

Hereinafter with reference to the drawings, embodiments of the present disclosure will be described. In the respective embodiments, for mutually the same or equivalent configurations, the same reference symbols are applied and the explanation thereof will be omitted.

First Embodiment

The driving assist apparatus that executes a driving assist method and a driving assist program according to the present embodiment is able to avoid a case where the driver of the own vehicle feels that a driving assist operation of the own vehicle is unnecessary. Specifically, the driving assist apparatus is used for a driving assist system of an own vehicle. Firstly, the driving assist system will be described.

Figure 1:
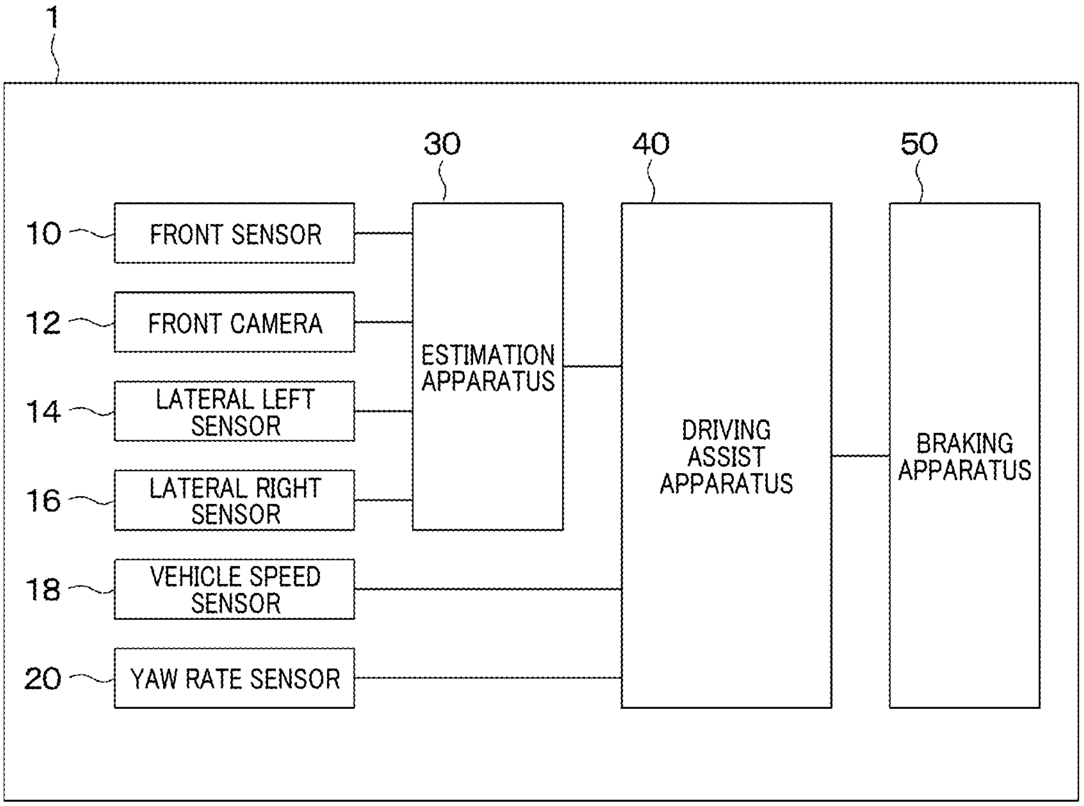
FIG. 1 is a diagram showing a configuration of a driving assist system using a driving assist apparatus according to a first embodiment.

As shown in FIG. 1, the driving assist system 1 is provided with a front sensor 10, a front camera 12, a lateral left side sensor 14, a lateral right sensor 16, a vehicle speed sensor 18, a yaw rate sensor 20, an estimation apparatus 30, a driving assist apparatus 40 and a braking apparatus 50.

Figure 2:
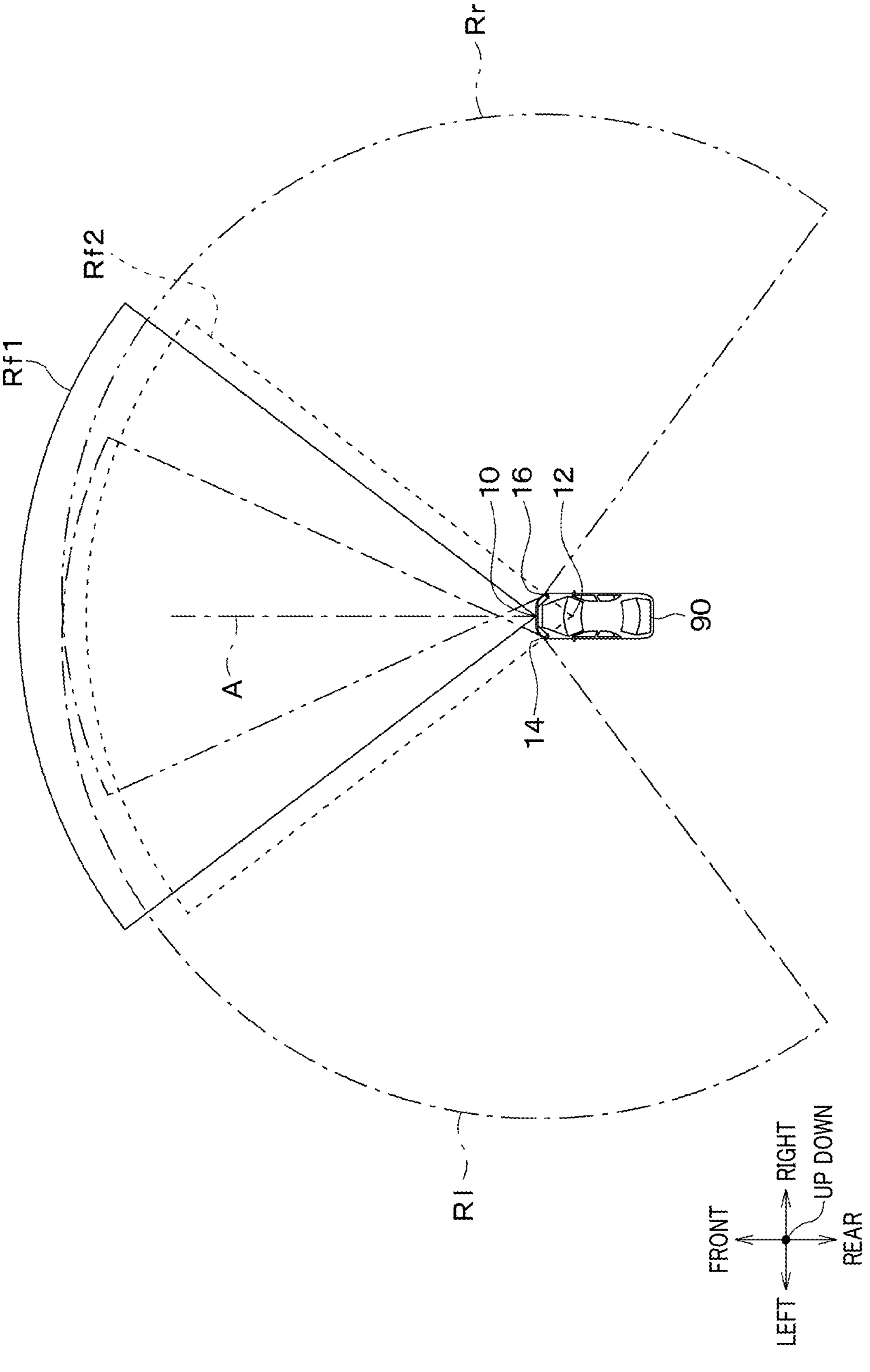
FIG. 2 is a diagram showing an own vehicle where a driving assist operation is performed by a driving assist apparatus.

As shown in FIG. 2, the front sensor 10 is disposed in a center part of a front bumper of an own vehicle 90 for example. Further, the front sensor 10 emits probe waves such as millimeter waves to irradiate an object ahead of the own vehicle 90. Further, the front sensor 10 receives reflected waves reflected at the object. Thus, the front sensor 10 detects the object existing ahead of the own vehicle 90. Moreover, the front sensor 10 calculates, in accordance with the emitted probe waves and the reflected waves, a relative location, an azimuth and a relative speed of the object with respect to the own vehicle 90. Further, the front sensor 10 outputs calculated data related to the object to the estimation apparatus 30 which will be described later. In FIG. 2, a range labeled as Rf1, where the front sensor 10 is capable of detecting objects, is indicated by a solid line. Further, Rf1 has symmetry with respect to a longitudinal axis A of the own vehicle 90. The longitudinal axis A passes through the center of the own vehicle 10, extending in the longitudinal direction of the own vehicle 90.

Here, the object refers to a moving object or a stationary object. The moving object refers to a vehicle under traveling or a moving pedestrian. The stationary object is a vehicle in a stationary state (stopped vehicle), a pedestrian, a guardrail, a median strip and the like.

Next, the front camera 12 is disposed on a back surface of an inner mirror of the own vehicle 90. Moreover, the front camera captures images ahead of the own vehicle. Also, the front camera 12 outputs the captured images to the estimation apparatus 30 which will be described later. In FIG. 2, Rf2 as a range where the front camera 12 is capable of capturing image is indicated by a dotted line. Moreover, Rf2 has symmetry with respect to the longitudinal axis A.

The lateral left sensor 14 is disposed in a left corner part of the front bumper of the own vehicle 90. Moreover, the left sensor 14 emits probe waves such as millimeter waves to irradiate a left side object. Also, the left sensor 14 receives reflected waves reflected at the object. Thus, the left sensor 14 detects objects existing in the left side of the own vehicle 90. The lateral left sensor 14 calculates, in accordance with the emitted probe waves and the reflected waves, a relative location, an azimuth and a relative speed of the object with respect to the own vehicle 90. Furthermore, the lateral left sensor 14 outputs calculated data related to the object to the estimation apparatus 30 which will be described later. In FIG. 2, a range labeled as R1, where the lateral left sensor 14 is capable of detecting objects, is indicated by a dashed line. Note that the area of R1 is larger than that of Rf1 or Rf2. Further, R1 partially overlaps with the Rf1 and Rf2 in a range from an obliquely left front side to a front side of the own vehicle 90.

The lateral right sensor 16 is disposed in a right corner part of the front bumper of the own vehicle. Also, the lateral right sensor 16 emits probe waves such as millimeter waves to irradiate a right side object of the own vehicle 90. Further, the right side sensor 16 receives reflected waves reflected at the object. Thus, the lateral right sensor 16 detects objects existing in the right side of the own vehicle 90. The lateral right sensor 16 calculates, in accordance with the emitted probe waves and the reflected waves, a relative location, an azimuth and a relative speed of the object with respect to the own vehicle 90. Moreover, the lateral right sensor 16 outputs calculated data related to the object to the estimation apparatus 30 which will be described later. In FIG. 2, a range labeled as Rr, where the lateral right sensor 16 is capable of detecting objects, is indicated by a two-dot chain line. Note that the area of Rr is larger than that of Rf1 or Rf2 and the same as that of R1. Further, Rr partially overlaps with the Rf1 and Rf2 in a range from an obliquely right front side to a front side of the own vehicle 90. Also, Rr partially overlaps with R1 in a front side of the own vehicle.

Referring back to FIG. 1, the vehicle speed sensor 18 outputs a signal responding to the vehicle speed of the own vehicle 90 to the driving assist apparatus 40 which will be described later. Note that the vehicle speed of the own vehicle 90 refers to a traveling speed of the vehicle 90.

The yaw rate sensor 20 outputs a signal responding to the yaw rate of the own vehicle 90 to the driving assist apparatus 40 which will be described later.

The estimation apparatus 30 is configured mainly of a microprocessor (i.e. computer), including a CPU, a ROM, a flash memory, a RAM, an I/O, a communication interface and a bus line that connects these units. Also, the estimation apparatus 30 executes programs stored in the ROM (i.e. non-transitory tangible recording media) of the estimation apparatus 30. Thus, the estimation apparatus 30 acquires an image captured by the front camera 12 from the front camera 12. Further, the estimation apparatus 30 acquires data related to an object from the front sensor 10, the lateral left sensor 14 and the lateral right sensor 16. Moreover, the estimation apparatus 30 calculates a yaw rate of the object in accordance with the acquired data related to the object. The calculation of the object will be described later. Then, the estimation apparatus 30 outputs the calculated yaw rate of the object to the driving assist apparatus which will described later, together with the acquired data about the object and the captured image.

The driving assist apparatus 40 is configured mainly of a microprocessor (i.e. computer), including a CPU, a ROM, a flash memory, a RAM, an I/O device, a communication interface and a bus line that connects these units. Also, the driving assist apparatus 40 executes programs stored in the ROM of the driving assist apparatus 40. Thus, the driving assist apparatus 40 acquires an image captured by the front camera 12, data related to an object detected by the front sensor 10, the lateral left sensor 14 and the lateral right sensor 16, and a yaw rate of the object calculated by the above-described estimation apparatus 30 from the estimation apparatus 30. Furthermore, the driving assist apparatus 40 acquires the vehicle speed (i.e. traveling speed) of the own vehicle 90 from the vehicle speed sensor 18. The driving assist apparatus 40 acquires a yaw rate of the own vehicle 90 from the yaw rate sensor 20. Then, the driving assist apparatus 40 outputs a signal to the braking apparatus 50 for performing the driving assist operation (automatic braking in this embodiment) in accordance with the acquired image, data related to the object, the yaw rate of the object, the vehicle speed of the own vehicle 90 and the yaw rate of the own vehicle 90.

The braking apparatus 50 applies a braking force to the wheels of the own vehicle 90 to brake the own vehicle 90 based on the signal transmitted from the driving assist apparatus 40. Thus, the driving assist operation is performed for the own vehicle 90.

The driving assist system 1 using the driving assist apparatus 40 according to the first embodiment is configured as described above. Next, calculation of the yaw rate of the object by the estimation apparatus 30 will be described.

Figure 3:
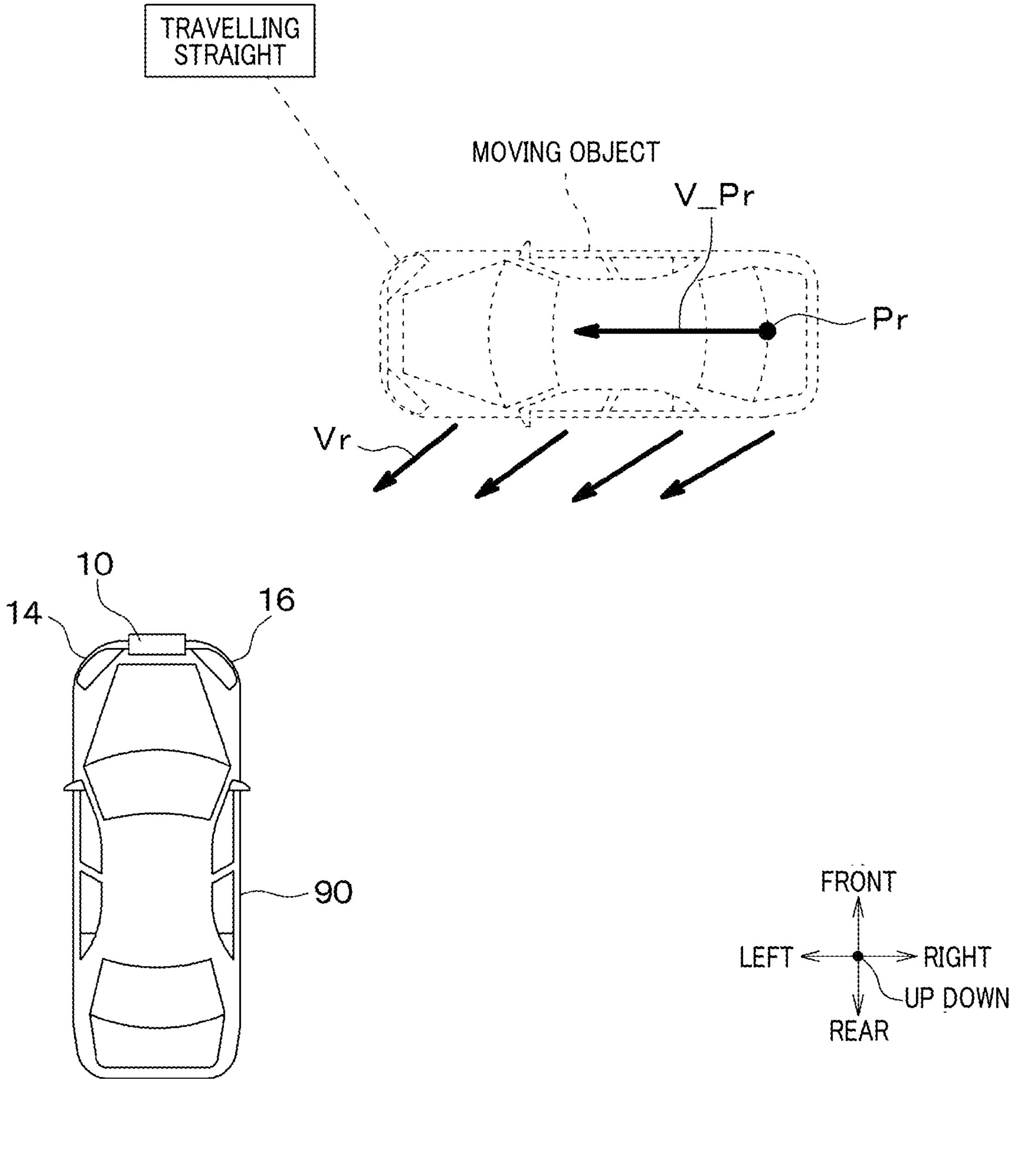
FIG. 3 is a diagram showing a relative speed of reflection points of a moving object which is moving straight ahead.
Figure 4:
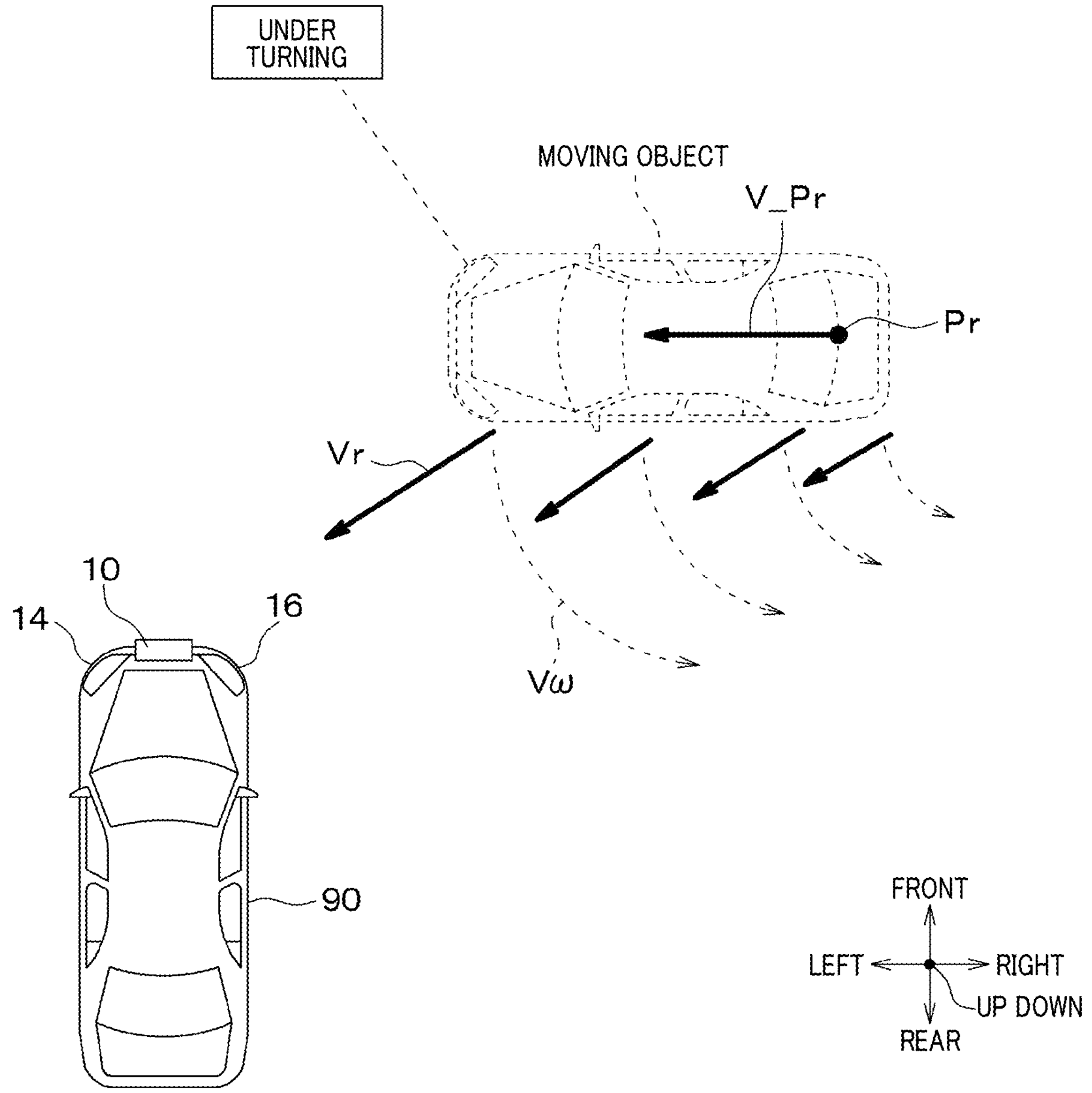
FIG. 4 is a diagram showing a relative speed of reflection points of a moving object which is turning.

Here, as shown in FIG. 3, when the moving object is travelling straight, relative speeds of a plurality of reflection points detected by the front sensor 10, the lateral left sensor 14 and the lateral right sensor 16 are the same. In contrast, as shown in FIG. 4, when the moving object is turning, the relative speeds of the plurality of reflection points detected by the front sensor 10, the lateral side sensor 14 and the lateral right sensor 16 are different from each other. The reason why the relative speeds are different from each other among respective reflection points when the object is turning, is that a rotational movement of the object produces a rotational velocity Vω at the respective reflection points depending on a distance from the center of the turn.

Figure 5:
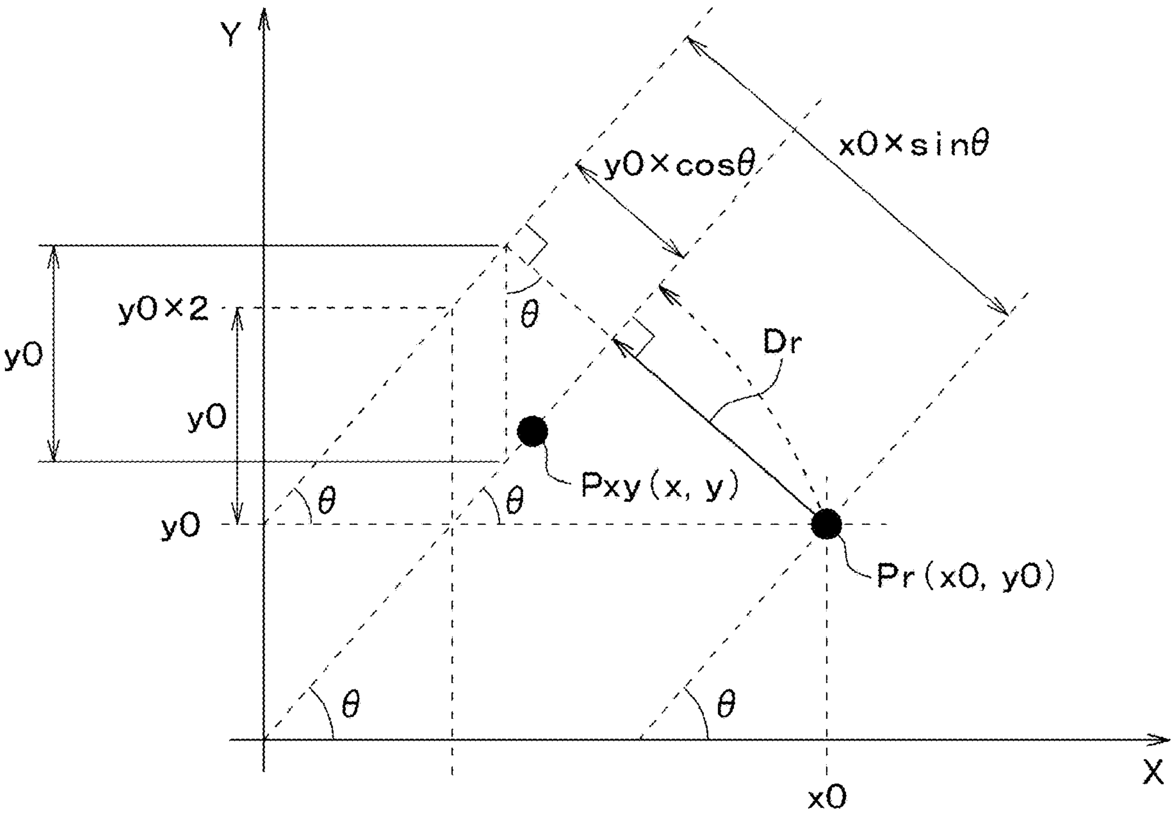
FIG. 5 is graph showing a reflection point and a reference point in an X-Y coordinate system.
Figure 6:
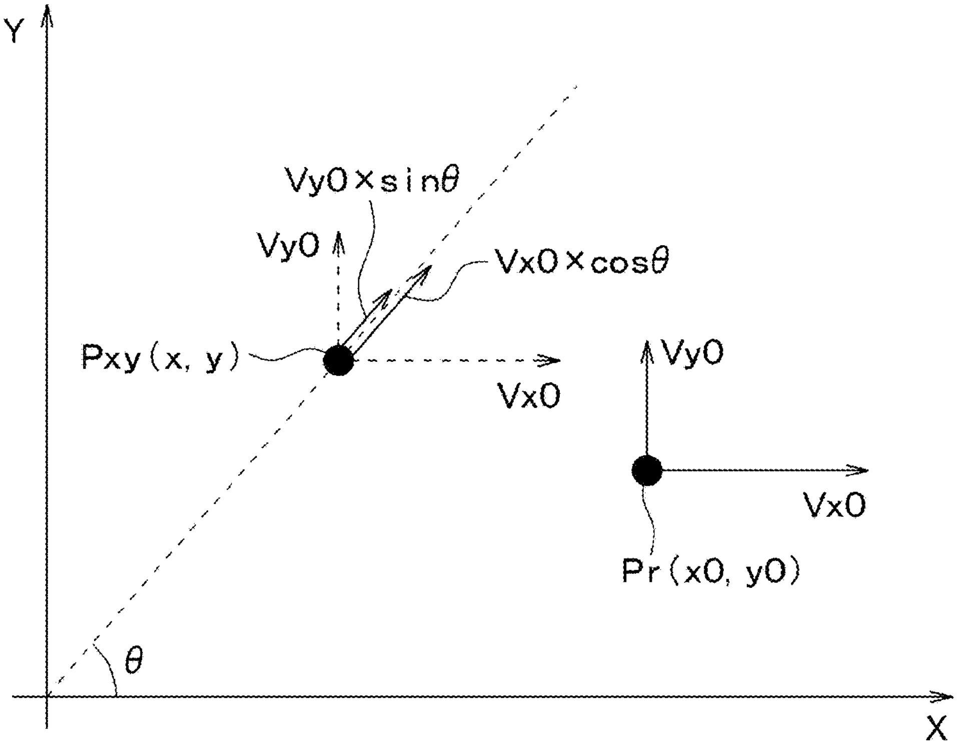
FIG. 6 is a graph showing a reflection point and a reference point in an X-Y coordinate system.

Here, a distance from the center of turn of the object is defined as r. The yaw rate of the object is defined as ω. Further, as shown in FIGS. 3, 4 and 5, any reference points in the object are defined as Pr. The velocity vector of Pr is defined as V_Pr. The XY coordinate system is defined as Cartesian coordinate system where the center of the turn of the object is the origin, lateral direction of the own vehicle 90 is X direction, a longitudinal direction of the own vehicle 90 is Y direction. The position of Pr in the XY coordinate system is defined as x0, y0. The X-direction component of V_Pr is defined as Vx0. The Y-direction component of V_Pr is defined as Vy0. The reflection point is defined as Pxy. The position of Pxy in the XY coordinate is defined as x, y. The azimuth of the reflection point relative to the own vehicle 90 is defined as θ. A distance from a straight line passing through Pxy at an angle θ to Pr is defined as Dr.

The X direction component of the velocity of Pxy is defined as Vx. The Y direction component of the velocity of Pxy is defined as Vy. The relative speed of Pxy relative to the own vehicle 90 is defined as Vr.

Then, Vx is expressed as the following relational equation (1-1). The Vy is expressed as the following relational equation (1-2). Further, Vr is expressed as the following relational expression (1-3). When substituting the following relational equations (1-1) and (1-2) for the following relational equation (1-3), Vr is expressed as the following relational equation (1-4). Moreover, x and y are expressed as x=r×cos θ and y=r×sin θ. Hence, when substituting x=r×cos θ and y=r×sin θ for the following relative equation (1-4), Vr is expressed as the following relative equation (1-5). In the case where Vx0×cos θ+Vy0×sin θ in the right side of the equation is moved to the left side of the equation, to exchange the right side and the left side of the equation, the following relative equation (1-6) is satisfied.

$$Vx = Vx0 - \omega \times (y - y0) \tag{1-1}$$

$$Vy = Vy0 + \omega \times (x - x0) \tag{1-2}$$

$$Vr = Vx \times \cos\theta + Vy \times \sin\theta \tag{1-3}$$

$$Vr = Vx0 \times \cos\theta + Vy0 \times \sin\theta + (-y \times \cos\theta + x \times \sin\theta) \times \omega + (y0 \times \cos\theta - x0 \times \sin\theta) \times \omega \tag{1-4}$$

$$Vr = Vx0 \times \cos\theta + Vy0 \times \sin\theta + (y0 \times \cos\theta - x0 \times \sin\theta) \times \omega \tag{1-5}$$

$$(y0 \times \cos\theta - x0 \times \sin\theta) \times \omega = Vr - (Vx0 \times \cos\theta + Vy0 \times \sin\theta) \tag{1-6}$$

Therefore, in the above-described relational equation (1-6), the left side parenthesis corresponds to Dr and a positional shift from Pr to Pxy in the circumferential direction. Further, the right side of the equation refers to a velocity in which a relative speed is subtracted from θ in the velocity vector of Pr, corresponding to the relative rotational speed Vrr and a velocity where a circumferential velocity component is canceled from a difference of velocity vectors between Pr and Pxy.

Hence, the estimation apparatus 30 calculates Dr and the relative rotational speed Vrr, thereby calculating the yaw rate of the object.

For example, the estimation apparatus 30 utilizes a tracking method such as an extended object tracking method to calculate a position of the reference point, that is x0 and y0. Moreover, the estimation apparatus 30 utilizes a tracking method such as an extended object tracking method to calculate a velocity vector of the reference point, that is, Vx0 and Vy0. Note that the extended object tracking method refers to a method in which an object is modeled assuming that the object has a shape and a movement state of the object is estimated in a time-series manner.

The estimation apparatus 30 extracts azimuths of respective reflection points, that is, θ, in accordance with data related to the object acquired by the front sensor 10, the lateral left sensor 14 and the lateral right sensor 16. Further, the estimation apparatus 30 extracts relative speeds of respective reflection points, that is, Vr, in accordance with data related to the object acquired by the front sensor 10, the lateral left sensor 14 and the lateral right sensor 16.

Figure 7:
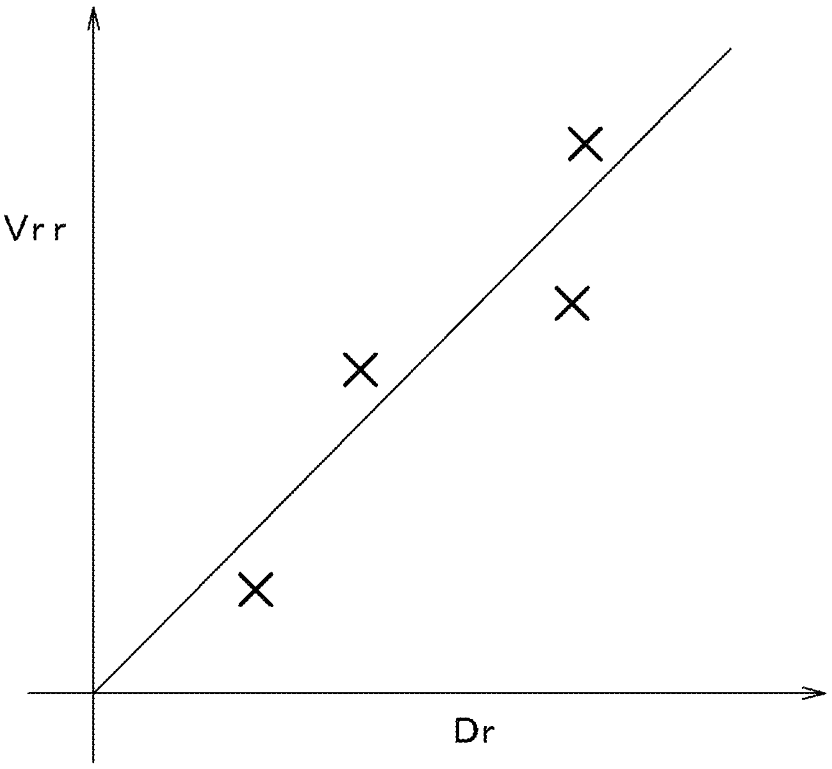
FIG. 7 is a graph showing a relationship between a distance to a straight line passing through reflection points from the reference point and a relative rotational speed.

Accordingly, the estimation apparatus 30 calculates Dr at the respective reflection points in accordance with the above-described calculated x0, y0 and the extracted θ. Moreover, the estimation apparatus 30 calculates the relative rotational speed Vrr at the respective reflection points in accordance with the above-described calculated Vx0, Vy0 and the extracted θ, Vr. Further, as shown in the above-described relational equation (1-6) and FIG. 7, an inclination of an approximation line when plotting Dr and the relative rotational speed Vrr of the respective reflection points corresponds to ω. Hence, the estimation apparatus 30 calculates ω, that is, the yaw rate of the object in accordance with the calculated Dr and the relative rotational speed Vrr.

As described above, the estimation apparatus 30 calculates the yaw rate of the object. Next, a driving assist operation of the own vehicle 90 performed by the driving assist apparatus 40 with execution of the programs will be described with reference to the flowchart shown in FIG. 8. Here, an automatic braking process will be described as an example of the driving assist operation. The programs of the driving assist apparatus 40 are executed when an ignition switch or the power of the own vehicle 90 is controlled to be ON. Further, a period of a series of processes from when the process at step S100 of the driving assist apparatus 40 is started to when the process returns to step S100 refers to a control period of the driving assist apparatus 40.

At step S100, the driving assist apparatus 40 acquires various information. Specifically, the driving assist apparatus 40 acquires the image captured by the front camera 12 from the estimation apparatus 30. Further, the driving assist apparatus 40 acquires data related to the object detected by the front sensor 10, the lateral left sensor 14 and the lateral right sensor 16. Moreover, the driving assist apparatus 40 acquires the yaw rate of the object calculated by the above-described estimation apparatus 30. Further, the driving assist apparatus 40 acquires the vehicle speed of the own vehicle

90 from the vehicle speed sensor 18. Also, the driving assist apparatus 40 acquires the yaw rate of the own vehicle 90 from the yaw rate sensor 20.

Subsequently, at step S102, the driving assist apparatus 40 determines whether either a LPB control or a PB control of an automatic braking control (described later) is being executed. Note that LPB is referred to as an abbreviation of Light Pre-collision Brake and PB is an abbreviation of Pre-collision Brake.

Then, in the case where either the LPB control or the PB control is being executed, the process of the driving assist apparatus 40 returns to step S100 and continues to execute the control processes under execution. Further, in the case where neither LBP control nor the PB control is being executed, or an execution of either the LPB control or the PB control is completed, the driving assist apparatus 40 proceeds to step S104.

At step S104 subsequent to step S102, the driving assist apparatus 40 determines, based on the information acquired at step S100, whether an intersecting object is present in the vicinity of the own vehicle 90. Note that the intersecting object refers to a moving object of which the trajectory intersects the trajectory of the own vehicle 90.

For example, the diving assist apparatus 40 calculates, in accordance with the vehicle speed of the own vehicle 90 and the yaw rate of the own vehicle 90 acquired at step S100, a turning radius of the own vehicle 90. Further, the driving assist apparatus 40 calculates the trajectory of the own vehicle 90 based on the calculated turning radius. Further, the driving assist apparatus 40 calculates a change in the location of the moving object in accordance with the captured image and the data related to the object acquired at step S100. Further, the driving assist apparatus 40 calculates the trajectory of the moving object based on the calculated change in the location of the moving object. Also, the driving assist apparatus 40 determines whether the calculated trajectory of the own vehicle 90 intersects the calculated trajectory of the moving object 90. Thus, the driving assist apparatus 40 determines whether an intersecting object is present in the vicinity of the own vehicle 90.

Then, in the case where the trajectory of the own vehicle 90 does not intersect the trajectory of the moving object, the driving assist apparatus 40 determines that an intersecting object is not present in the vicinity of the own vehicle 90. Thereafter, the process of the driving assist apparatus 40 returns to step S100. In the case where the trajectory of the own vehicle 90 intersects the trajectory of the moving object, the driving assist apparatus 40 determines that an intersecting object is present in the vicinity of the own vehicle 90. Thereafter, the process of the driving assist apparatus 40 proceeds to step S106.

At step S106 subsequent to step S104, the driving assist apparatus 40 determines whether an intersecting object relative distance Dco is within a predetermined range. Thus, the driving assist apparatus 40 determines whether the probability of collision between the own vehicle 90 and the intersecting object is very high. Note that, the intersecting object relative distance Dco refers to a distance from the own vehicle 90 to the intersecting object detected at step S104 in the lateral direction of the own vehicle 90. The lateral direction of the own vehicle 90 corresponds to the lateral direction of the own vehicle 90.

For example, the driving assist apparatus 40 extracts a relative location and an azimuth of the intersecting object with respect to the own vehicle 90 in accordance with the captured image and data related to the object acquired at step S100. Moreover, the driving assist apparatus 40 calculates the intersecting object relative distance Dco in accordance with the extracted relative location and azimuth.

Figure 8:
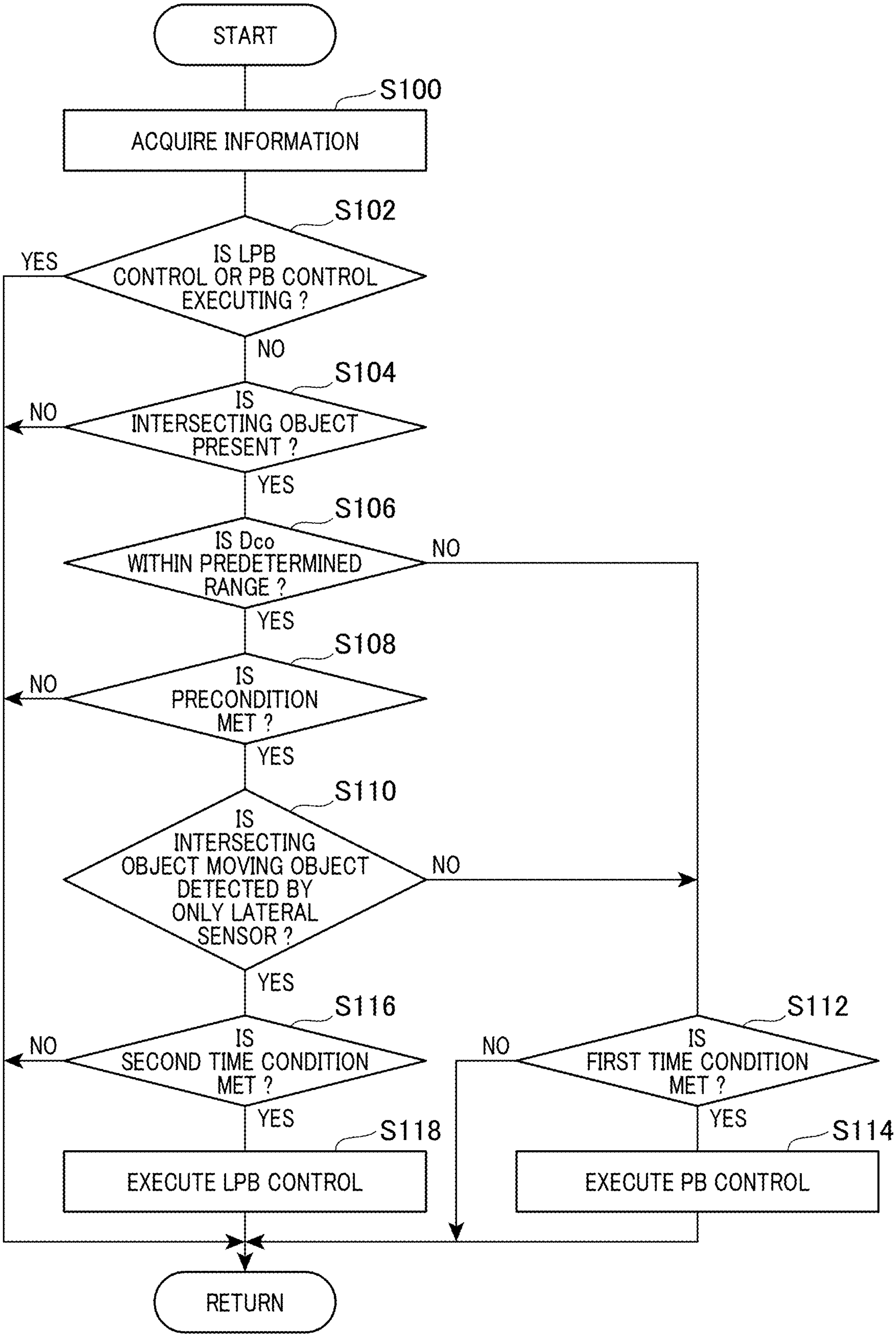
FIG. 8 is a flowchart showing processes executed by a driving assist apparatus.

Then, referring back to the flowchart shown in FIG. 8, the driving assist apparatus 40 determines, when the calculated intersecting object relative distance Dco is within a predetermined range, that probability of collision between the own vehicle 90 and the intersecting object is very high. Thereafter, the process of the driving assist apparatus 40 proceeds to step S112. Also, the driving assist apparatus 40 determines, when the calculated intersecting object relative distance Dco is out of the predetermined range, that probability of collision between the own vehicle 90 and the intersecting object is not so high. Then, the process of the driving assist apparatus 40 proceeds to step S108. Note that the predetermined range for the intersecting object relative distance Dco is set by an experiment or a simulation such that a determination is made whether probability of collision between the own vehicle 90 and the intersecting object is very high.

At step S108 subsequent to S106, the driving assist apparatus 40 determines whether the following precondition is met in order to determine whether probability of collision between the own vehicle 90 and the intersecting object is high, although the probability of collision between the own vehicle 90 and the intersecting object is not very high.

Here, the precondition is satisfied when the following conditions 1 to 7 are met.

[Condition 1] vehicle speed of the own vehicle 90 is a predetermined vehicle speed threshold or higher.

[Condition 2] yaw rate of the own vehicle 90 is less than a predetermined yaw rate.

[Condition 3] turning radius of the own vehicle 90 is larger or equal to a predetermined turning radius.

[Condition 4] yaw rate of the intersecting object is within a predetermined range.

[Condition 5] collision prediction position on the own vehicle 90 to be collided with the intersecting object is within a predetermined positional range.

[Condition 6] condition 5 is continuously met for a predetermined number of control periods.

[Condition 7] intersecting object is not a ghost.

Also, the vehicle speed threshold of the condition 1 is set to be a value allowing the condition 1 to be met in the case where the own vehicle 90 is not in a stopped state.

The yaw rate in the condition 2 is set to be a value allowing the condition 2 to be met in the case where the own vehicle 90 travels straight or on a trajectory close to a straight line.

The turning radius of the condition 3 is set to be a value allowing the condition 3 to be met in the case where the own vehicle 90 travels straight or on a trajectory close to a straight line. Further, the turning radius threshold is changed depending on the vehicle speed of the own vehicle 90.

Figure 9:
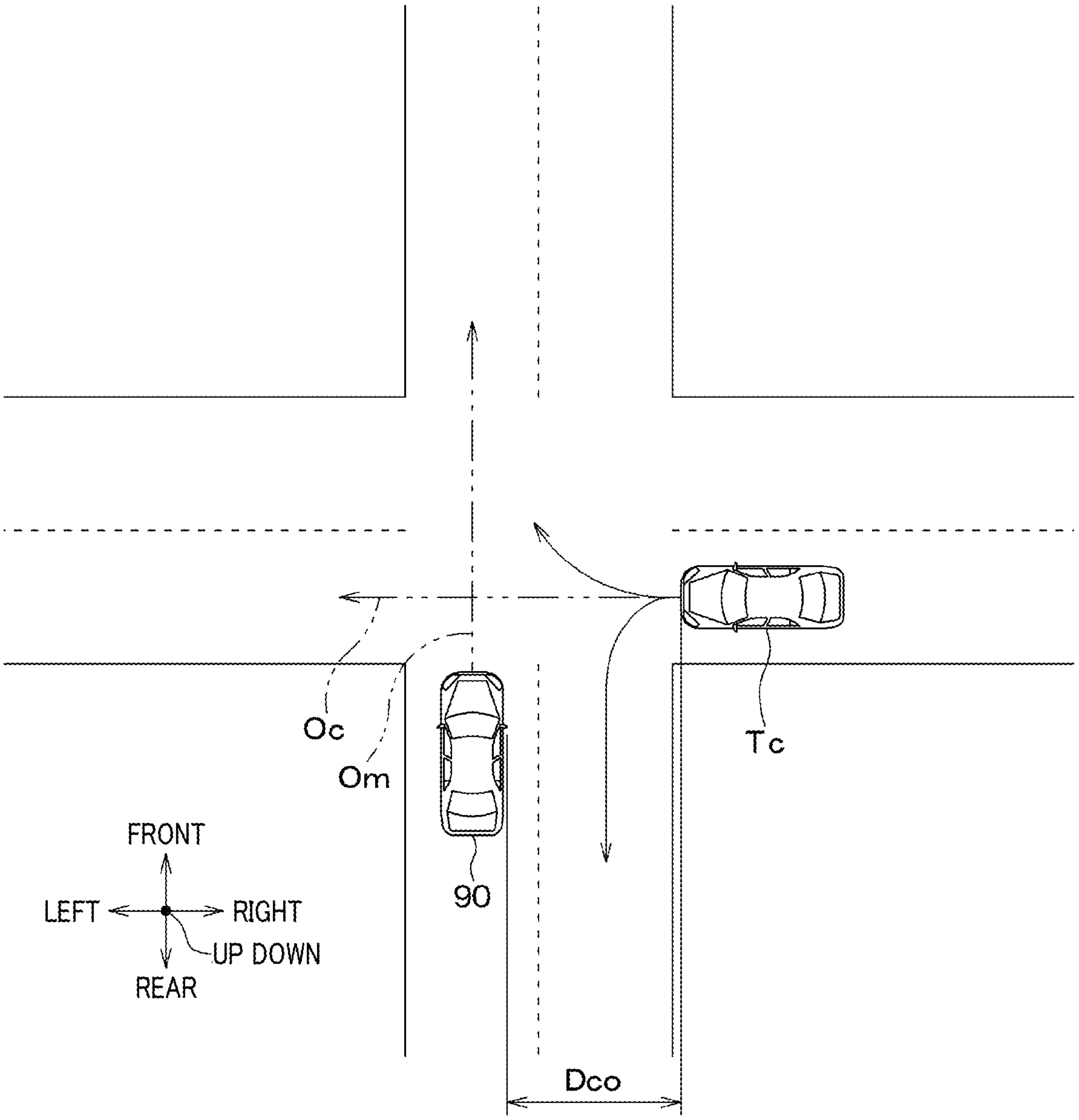
FIG. 9 is a diagram showing an own vehicle and an intersecting object.

The predetermined range for the yaw rate of the intersecting object in the condition 4 is set to be a value allowing the condition 4 to be met in the case where the intersecting object travels straight or on a trajectory close to a straight line. The case where the yaw rate of the intersecting object is out of the predetermined range is, as shown in FIG. 9, a case where the intersecting object makes a left turn or a right turn to change the lane, for example, as long as the intersecting object is a vehicle. In FIG. 9, the trajectory of the own vehicle 90 is Om and indicated by a two-dot chain line and an arrow. The intersecting object is indicated by Tc. Also, the trajectory of the intersecting object is Oc and indicated by a two-dot chain line and an arrow. Further, a left turn and a right turn are each indicated by a solid line and an arrow.

The condition 5 is met in the case where it is determined that a collision will occur between the own vehicle 90 and the intersecting object, when the vehicle travels maintaining the current travelling state and the intersecting object moves maintaining the current moving state. Note that the predicted collision position of the condition 5 refers to a position at which a collision is predicted between the own vehicle 90 and the intersecting vehicle.

Figure 10:
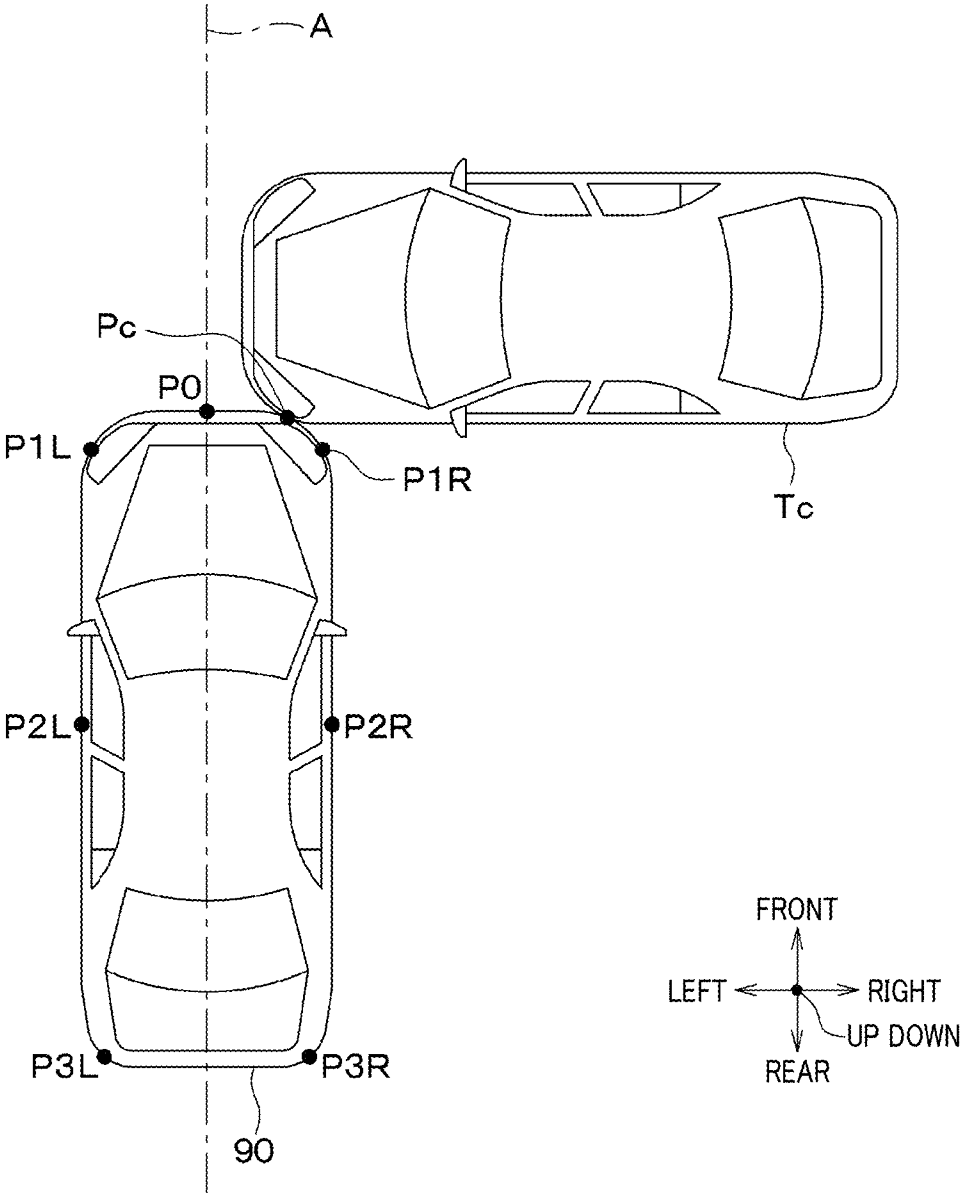
FIG. 10 is a diagram showing a predicted collision position between the own vehicle and the intersecting object

Here, as shown in FIG. 10, the predicted collision position is defined as Pc. A center part of the front bumper of the own vehicle 90 is defined as a start point P0. A right corner part of the front bumper of the own vehicle 90 is defined as a right side front corner point P1R. A center part of a lateral right surface of the own vehicle 90 is defined as a right side center point P2R. A right corner part of the rear bumper of the own vehicle 90 is defined as a right side end point P3R. A left corner part of the front bumper of the own vehicle 90 is defined as a left side corner point P1L. A center part of a lateral left surface of the own vehicle 90 is defined as a left side center point P2L. A left corner part of the rear bumper of the own vehicle 90 is defined as a left side end point P3L. In FIG. 10, the intersecting object is indicated by Tc.

Also, values are set on the outline of the own vehicle 90 depending on respective positions. Note that values related to a start point P0 are defined as a0. The right side front corner point P1R is defined as a1. The right side center point P2R is defined as a2. The right side end point P3R is defined as a3. The left side corner point P1L is defined as −a1. The left side center point P2L is defined as −a2. The left side end point P3L is defined as −a3. Further, values related to Pc are defined as ac.

Further, a relationship of a0<a1<a2<a3 is satisfied. Thus, values on the outline of the own vehicle 90 increases towards the right side end point P3R from the start point P0. Further, a relationship of −a3<−a2<−a1<a0 is satisfied. Hence, the values on the outline of the own vehicle 90 decreases towards the left side end point P3L from the start point P0.

Then, for example, in the case where Pc is present within a range from the right side front corner point P1R to the left side front corner point P1L, that is, a relationship a0<ac<a1 is satisfied, the condition 5 is met. Hence, when Pc is present in a predetermined range set by the start point P0, the right side front corner point P1R, the right side center point P2R, the right side end point P3R, the left side front corner point P1L, the left side center part P2L and the left side end point P3L, the condition 5 is met. Further, in the case where Pc is not present in a predetermined range set by the start point P0, the right side front corner point P1R, the right side center part P2R, the right side end point P3R, the left side front corner point P1L, the left side center point P2L and the left side end point P3L, the condition 5 is not met.

The condition 6 is introduced in order to secure that the intersecting object is a substantial object. Further, the condition 6 is introduced in order to secure a reliability of the intersecting object.

The condition 7 is introduced in order to secure that the intersecting object is a substantial object. Further, the condition 7 is introduced in order to secure a reliability of the intersecting object. Note that the ghost in the condition 7 is an object produced in the case where the driving assist apparatus 40 erroneously determines the location of the object due to a reflection of electromagnetic waves at a signboard or the like.

Hence, the driving assist apparatus 40 determines whether the condition 1 is met using a vehicle speed of the own vehicle 90 acquired at step S100.

Further, the driving assist apparatus 40 determines whether the condition 2 is met using a yaw rate of the own vehicle 90 acquired at step S100.

Furthermore, the driving assist apparatus 40 determines whether the condition 3 is met using a turning radius of the own vehicle 90 acquired at step S104.

Moreover, the driving assist apparatus 40 determines whether the condition 4 is met using a yaw rate of the intersecting object acquired at steps S100 and S104.

Further, the driving assist apparatus 40 calculates Pc in accordance with the trajectory of the own vehicle 90 and the trajectory of the moving object acquired at step S104 and calculates ac. Then, the driving assist apparatus 40 determines whether the condition 5 is met in accordance with a range set by the calculated ac, −a3, −a2, −a1, a0, a1, a2, a3.

Further, the driving assist apparatus 40 determines whether the condition 6 is met by using the number of times the above-described condition 5 is met.

Moreover, the driving assist apparatus 40 utilizes a change in the location of the intersecting object calculated at step S104 or a tracking method such as an extended object tracking method to determine whether the condition 7 is met.

Then, referring back to FIG. 8, the driving assist apparatus 40 determines that the precondition is not met when the conditions 1 to 7 are not met. At this moment, the driving assist apparatus 40 determines that the probability of collision between the own vehicle 90 and the intersecting object is low. Thereafter, the process of the driving assist apparatus 40 returns to step S100. Moreover, the driving assist apparatus 40 determines that the precondition is met in the case where the conditions 1 to 7 are all met. At this point, the driving assist apparatus 40 determines that the probability of collision between the own vehicle 90 and the intersecting object is high. Then, the process of the driving assist apparatus 40 proceeds to step S110.

At step S110 subsequent to step S108, the driving assist apparatus 40 determines whether the intersecting object determined at step S104 is a moving object detected by only either the lateral left sensor 14 or the lateral right sensor 16. Thus, the driving assist apparatus 40 determines the type of the intersecting object. Here, the driving assist apparatus 40 determines whether the intersecting object is the first object or the second object.

Figure 11:
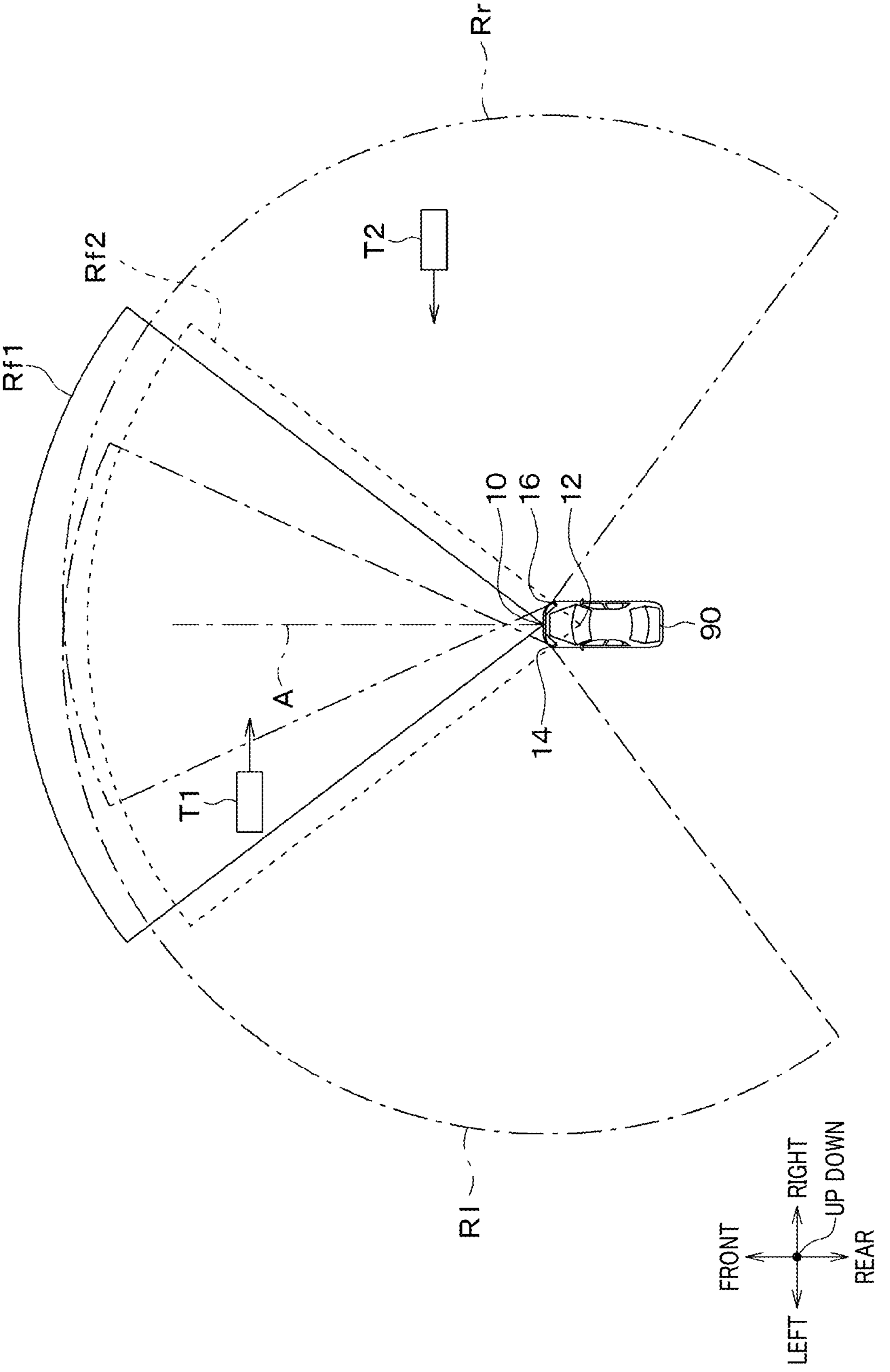
FIG. 11 is a diagram showing a first object and a second object.

Then, in the case where the intersecting object is not an object detected by only either the lateral left sensor 14 or the lateral right sensor 16, it means that the intersecting object is detected by the front sensor 10 and the front camera 12. At this time, the driving assist apparatus 40 determines that the intersecting object determined at step S104 to be the first object as shown in FIG. 11. Thereafter, the process of the driving assist apparatus 40 proceeds to step S112. Also, in the case where the intersecting object detected by only either the lateral left sensor 14 or the lateral right sensor 16 is a moving object, the driving assist apparatus 40 determines the intersecting object determined at step S104 to be the second object. Thereafter, the process of the driving assist apparatus 40 proceeds to step S116. Note that the first object is indicated by T1 in FIG. 11. The second object is indicated by T2.

Referring back to the flowchart shown in FIG. 8, step S112 is determined when the intersecting object relative distance Dco is within a predetermined range. At this time, the own vehicle 90 is highly likely to collide with the intersecting object (collision probability is very high). Otherwise, step S112 is determined in the case where the precondition of step S108 is met and the intersecting object is the first object. When the intersecting object is the first object, since the intersecting object is a moving object detected by at least the front sensor 10 and the front camera 12, the driver of the own vehicle 90 is a moving object which is visibly recognizable. Hence, in the case where the intersecting object is a first object, since the driver of the own vehicle 90 recognizes the intersecting object, it is predicted that an automatic braking control is executed.

Hence, at step S112, the driving assist apparatus 40 determines whether the PB control of the automatic braking control is required to be executed. Therefore, the driving assist apparatus 40 determines whether a first time condition is met. According to the PB control, as will be described later, a target deceleration factor of the own vehicle 90 is relatively larger and the braking force is relatively large.

Here, the first time condition is met when the following conditions from F1_1 to condition F1_4 are all met. Note that the following TTC is an abbreviation of Time to Collision, TTS is an abbreviation of Time to Steer, TTB is an abbreviation of Time to Brake and TCC is an abbreviation of Time to Conclusive Collision.

[Condition F1_1] Time to collision TTC is less than or equal to a predetermined first time threshold TTC_th1

[Condition F1_2] Time to steer TTS is less than or equal to a predetermined first steering time threshold TTS_th1

[Condition F1_3] Time to brake TTB is less than or equal to a predetermined first braking time threshold TTB_th1

[Condition F1_4] Time to conclusive collision TCC is less than or equal to a predetermined first margin time threshold TCC_th1

Further, the time to collision TTC refers to a predicted time required for the own vehicle 90 to collide with the moving object, and is calculated by dividing the distance to the moving object by the relative speed.

The time to steer TTS refers to a limit time for avoiding a collision with a moving object using a steering operation of the driver. The TTS is acquired by calculating a start time of a steering operation with a predetermined lateral acceleration to avoid a collision with the moving object. The start time is calculated considering a limit period from the current time to start the steering operation with which the collision can be avoided.

The time to brake TTB refers to a limit time for avoiding a collision with a moving object using a braking operation of the driver. The TTB is acquired by calculating a start time of a braking operation with a predetermined deceleration to avoid a collision with the moving object. The start time is calculated considering a limit period from the current time to start the braking operation with which the collision can be avoided.

The time to conclusive collision TCC is acquired by calculating a limit time, to avoid collision with the own vehicle 90, from the current time to a time when the moving object starts acceleration or deceleration with a predetermined acceleration or deceleration.

Further, the first time threshold TTC_th1, the first steering time threshold TTS_th1, the first braking time threshold TTB_th1 and the first margin time threshold TTC_th1 are calculated in advance in the following manner. The above-described respective thresholds are set by an experiment or a simulation such that a timing with which the first time threshold is satisfied does not cause passengers not to feel that the PB control unnecessarily starts, and the timing appropriately avoids a collision between the own vehicle 90 and the moving object.

Therefore, the driving assist apparatus 40 calculates a relative distance of the intersecting object with respect the own vehicle 90 in accordance with the relative location of the intersecting object with respect to the own vehicle 90 acquired at step S100. The driving assist apparatus 40 calculates a time to collision TTC using a relative speed of the intersecting object with respect to the own vehicle 90 acquired at step S100. Moreover, the driving assist apparatus 40 calculates the time to steering TTS, the time to braking TTB and the time to conclusive collision TCC.

Also, the driving assist apparatus 40 determines whether the condition F1_1 is met using the above-described calculated time to collision TTC. Further, the driving assist apparatus 40 determines whether the condition F1_2 is met using the above-described calculated time to steering TTS. Further, the driving assist apparatus 40 utilizes the above-described calculated time to braking TTB to determine whether the condition F1_3 is met. Further, the driving assist apparatus 40 utilizes the above-described calculated time to conclusive collision TCC to determine whether the condition F1_4 is met.

Then, the driving assist apparatus 40 determines that the first time condition is not met when the conditions F1_1 to F1_4 are not met. At this moment, since the probability of collision between the own vehicle 90 and the intersecting object is low, the driving assist apparatus 40 determines that the PB control should not be executed. Thereafter, the process of the driving assist apparatus 40 returns to step S100. Further, the driving assist apparatus 40 determines that the first time condition is met when the conditions F1_1 to F1_4 are met. At this time, since the own vehicle 90 is likely to collide with the intersecting object, the driving assist apparatus 40 determines that the PB control should be executed. Then, the process of the driving assist apparatus proceeds to step S114.

At step S114 subsequent to step S112, the driving assist apparatus 40 executes the PB control. Specifically, the driving assist apparatus 40 outputs a signal for executing the PB control to the braking apparatus 50. Thus, the braking apparatus 50 applies relatively large braking force to the wheels of the own vehicle 90, thereby making an amount of target deceleration of the own vehicle 90 relatively large. Hence, the own vehicle 90 is automatically stopped. At this time, it is possible that the own vehicle 90 collides with the intersecting object, the driver of the own vehicle 90 is unlikely to feel that the PB control is unnecessary. Also, at this time, since the driver of the own vehicle 90 recognizes the intersecting object and thus predicts that an automatic braking control is executed, the driver of the own vehicle 90 is unlikely to feel that the PB control is unnecessary. Thereafter, the process of the driving assist apparatus 40 returns to step S100.

Next, at step S116 subsequent to step S110, the precondition at step S108 is met and the intersecting object is the second object. At this time, since the intersecting object is a moving object detected by only either the lateral left sensor 14 or the lateral right sensor 16, the driver of the own vehicle 90 cannot visibly recognize this moving object. Accordingly, at this time, the driver of the own vehicle 90 does not recognize the intersecting object and does not predict that the automatic braking control is executed.

Hence, at step S116 subsequent to step S110, the driving assist apparatus 40 determines whether the LPB control of the automatic braking control should be executed. For this reason, the driving assist apparatus 40 determines whether the second time condition is met. According to the LBP control, as will be described later, an amount of the target deceleration of the own vehicle 90 is relatively small compared to that of the PB control, and the braking force is also relatively small compared to that of the PB control. Further, according to the LPB control, a jerk is moderate compared to that of the PB control. The jerk refers to a change rate of the deceleration during a period where the deceleration changes to reach the target deceleration.

Here, the second time condition is met when the following conditions F2_1 to F2_4 are all met.

[Condition F2_1] Time to collision TTC is less than or equal to a predetermined second time threshold TTC_th2.

[Condition F2_2] Time to steering TTS is less than or equal to a predetermined second steering time threshold TTS_th2.

[Condition F2_3] Time to braking TTB is less than or equal to a predetermined second braking time threshold TTB_th2.

[Condition F2_4] Time to conclusive collision TCC is less than or equal to a predetermined second margin time threshold TCC_th2.

Further, the second time threshold TTC_th2, the second steering time threshold TTS_th2, the second braking time threshold TTB_th2 and the second margin time threshold TCC_th2 are set in advance in the following manner. The second time threshold TTC_th2 is larger than the first time threshold TTC_th1. The second steering time threshold TTS_th2 is larger than the first steering time threshold TTS_th1. The second braking time threshold TTB_th2 is larger than the first braking time threshold TTB_th1. The second margin time threshold TCC_th2 is larger than the first margin threshold TCC_th1. For these threshold values, the second time condition is met at a time earlier than the first time condition. Hence, the LPB control starts earlier than the PB control.

Hence, the driving assist apparatus 40 calculates the relative distance of the intersecting object with respect to the own vehicle 90 in accordance with the relative location of the intersecting object with respect to the own vehicle 90 acquired at step S100. The driving assist apparatus 40 calculates the time to margin TTC using the calculated relative location of the intersecting object with respect to the own vehicle 90 and the relative speed of the intersecting object with respect to the own vehicle 90 acquired at step S100. Further, the driving assist apparatus 40 calculates the time to steering TTS, the time to braking TTB and the time to conclusive collision TCC.

Also, the driving assist apparatus 40 determines whether the condition F2_1 is met using the above-described calculated time to collision TTC. Further, the driving assist apparatus 40 utilizes the above-described calculated time to steering TTS to determine whether the condition F2_2 is met. Moreover, the driving assist apparatus 40 utilizes the above-described calculated time to braking TTB to determine whether the condition F2_3 is met. Moreover, the driving assist apparatus 40 utilizes the above-described calculated time to conclusive collision TCC to determine whether the condition F2_4 is met.

Then, the driving assist apparatus 40 determines that the second time condition is not met when the conditions F2_1 to F2_4 are not met. At this moment, since the probability of collision between the own vehicle 90 and a second object of the intersecting object is low, the driving assist apparatus 40 determines that the LPB control should not be executed. Thereafter, the process of the driving assist apparatus 40 returns to step S100. Further, the driving assist apparatus 40 determines that the first time condition is met when the conditions F2_1 to F2_4 are all met. At this moment, since the own vehicle 90 possibly collides with the second object of the intersecting object, the driving assist apparatus 40 determines that the LPB control should be executed. Thereafter, the process of the driving assist apparatus 40 proceeds to step S118.

At step S118 subsequent to step S116, the driving assist apparatus 40 executes the LPB control. Specifically, the driving assist apparatus 40 outputs a signal for executing the LPB control to the braking apparatus 50. Thus, the braking apparatus 50 applies a braking force smaller than that of the PB control to the wheels of the own vehicle 90, thereby making an amount of target deceleration of the own vehicle 90 smaller than that of the PB control and making the jerk of the own vehicle 90 lower than that of the PB control. Hence, the own vehicle 90 is automatically stopped. At this time, since the driver of the own vehicle 90 does not recognize the intersecting object and does not predict that the automatic braking is executed, the driver of the own vehicle 90 is unlikely to feel occurrence of sudden inertia force due to a deceleration of the own vehicle 90. Hence, the driver of the own vehicle 90 is unlikely to feel that the LPB control is unnecessary. Moreover, since an amount of the braking force applied to the own vehicle 90 according to the LPB control is relatively small, the distance at which the own vehicle 90 stops from a time when the LPB control is started, is relatively longer. However, since the LPB control starts earlier than that of the PB control, a collision between the own vehicle 90 and the intersecting object can be appropriately avoided. Thereafter, the process of the driving assist apparatus 40 returns to step S100.

As described above, the driving assist apparatus 40 performs a driving assist of the own vehicle 90, that is, an automatic braking in this embodiment. Next, an effect of suppressing a case where the driver of the own vehicle 90 feels that the driving assist is unnecessary, will be described.

According to the configuration of the above-described patent literature (JP-A-2010-30513), when the driving assist apparatus performs a forcible braking operation to avoid a collision, since the driver of the own vehicle suddenly feels an inertia force due to a deceleration of the own vehicle, the driver of the own vehicle possibly feels the forcible braking unnecessary.

In contrast, the driving assist apparatus 40 according to the present embodiment serves as an acquiring unit that acquires information obtained by the front sensor 10 and the front camera 12, information obtained by the lateral left sensor 14 and the lateral right sensor 16, and information about the own vehicle 90. Moreover, the driving assist apparatus 40 serves as an assist unit that performs a driving assist of the own vehicle 90 based on information about the intersecting object detected by a sensor including a yaw rate of the intersecting object. Note that information acquired by the front sensor 10, the front camera 12, the lateral left sensor 14 and the lateral right sensor 16 includes a relative location of the object, an azimuth and a relative speed of the object with respect to the own vehicle 90, a yaw rate and captured image of the object. The information about the own vehicle 90 is, for example, a vehicle speed and a yaw rate of the own vehicle 90.

Further, the driving assist 40 performs a PB control in the case where the yaw rate of the intersecting object is within a predetermined range and the sensor that detects the intersecting object is at least the front sensor 10 and the front camera 12. The driving assist apparatus 40 executes the LPB control in the case where the yaw rate of the intersecting object is within a predetermined range and the sensor that detects the intersecting object is only either the lateral left sensor 14 or the lateral right sensor 16. Note that the PB control corresponds to first braking control. The LPB control corresponds to second braking control.

In the case where the sensor that detects the intersecting object is at least the front sensor 10 and the front camera 12, the intersecting object is a moving object which is visibly recognizable by the driver of the own vehicle 90. Hence, since the driver of the own vehicle 90 recognizes the intersecting object, the driver of the own vehicle 90 predicts that the automatic braking control is executed. Therefore, at this moment, even when the PB control is executed, the driver of the own vehicle 90 is unlikely to feel that PB control is unnecessary. Further, in the case where the sensor that detects the intersecting object is only either lateral left sensor 14 or the lateral right sensor 16, the intersecting object is a moving object which is visibly unrecognizable by the driver of the own vehicle 90. Hence, at this moment, the driver of the own vehicle 90 does not recognize the intersecting object and does not predict that the automatic braking is executed. Hence, at this moment, the LPB control is executed with a braking force smaller than that of the PB control, whereby the driver of the own vehicle 90 is unlikely to feel occurrence of sudden inertia force due to the deceleration of the own vehicle 90. Therefore, the driver of the own vehicle 90 is unlikely to feel that the PB control is unnecessary. Accordingly, a case where the driver of the own vehicle 90 feels that the driving assist is unnecessary, can be suppressed.

Further, in the precondition at step S108, for condition 4, instead of using the condition where the yaw rate of the intersecting object is within a predetermined range, a condition may be used in which the intersecting angle θc is within a predetermined range. Note that the intersecting angle θc refers to an angle formed between the velocity vector of the own vehicle 90 and the velocity vector of the intersecting object.

Figure 12:
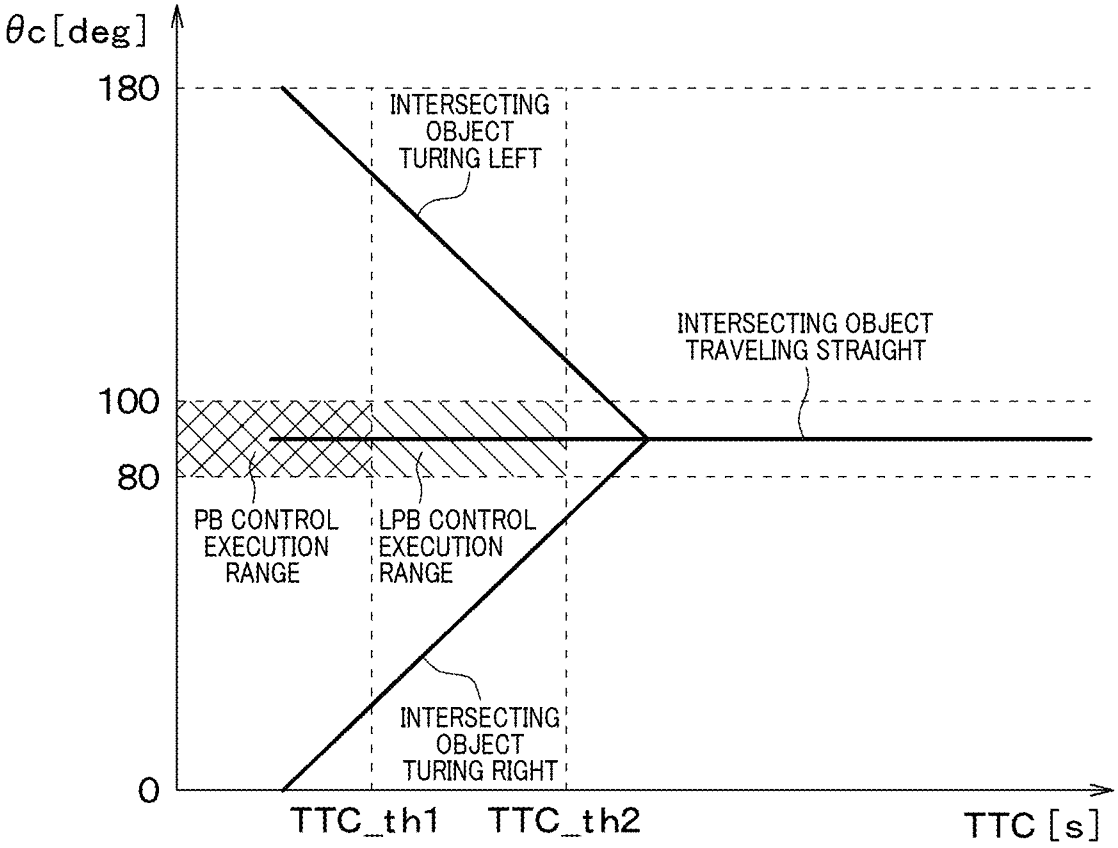
FIG. 12 is a graph showing a relationship between a time to collision and an intersecting angle

When using the intersecting angle θc and assuming that the predetermined range is from 80° to 100° for example, as shown in FIGS. 9 and 12, in the case where the intersecting angle θc is approximately 90°, the driving assist apparatus 40 is able to determine whether the intersecting object travels straight or makes a left turn or a right turn. Hence, in the case where the intersecting angle θc is approximately 90°, the driving assist apparatus 40 is able to appropriately execute the PB control and the LPB control.

Figure 13:
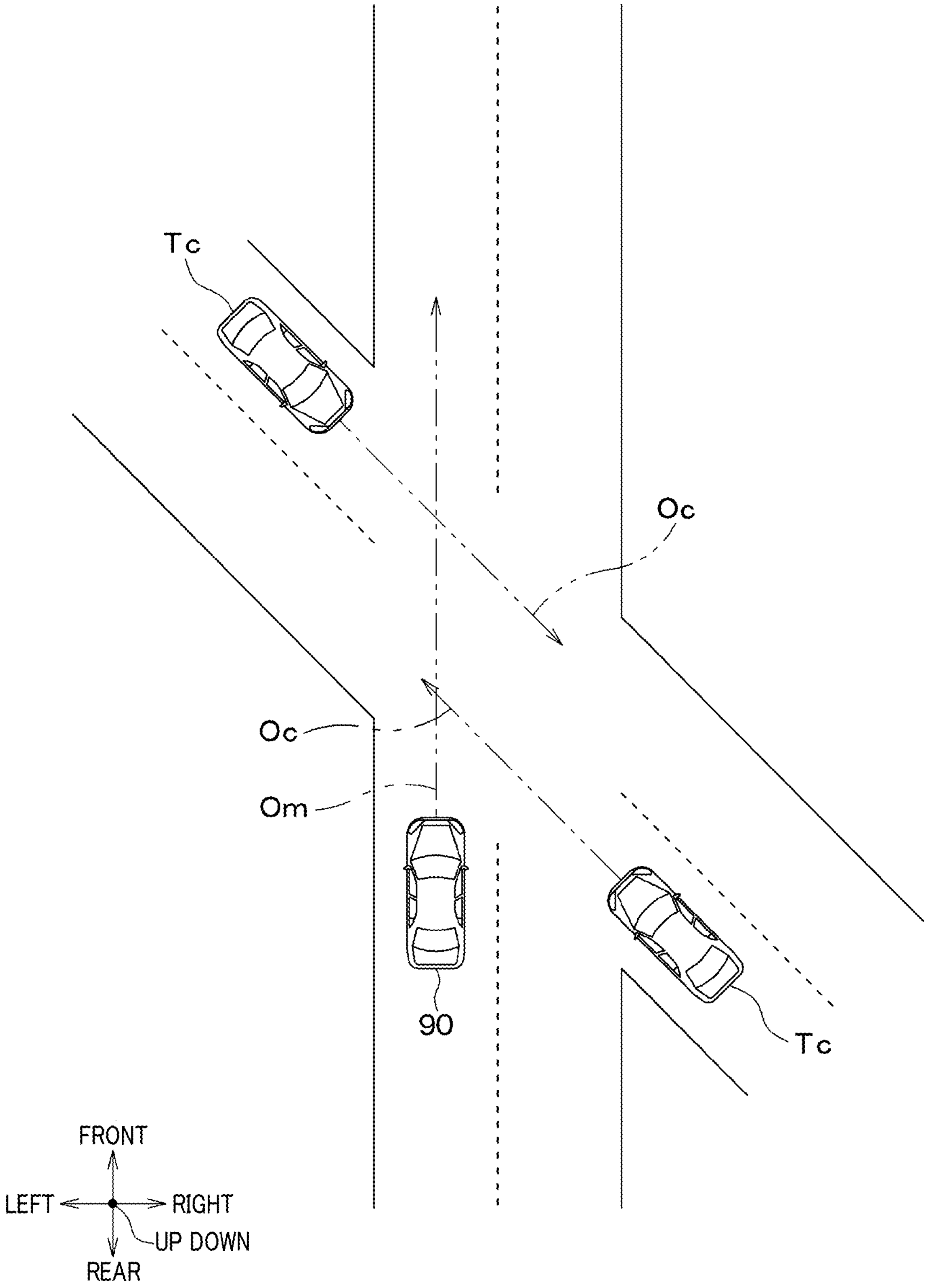
FIG. 13 is a diagram showing an own vehicle and intersecting vehicles.
Figure 14:
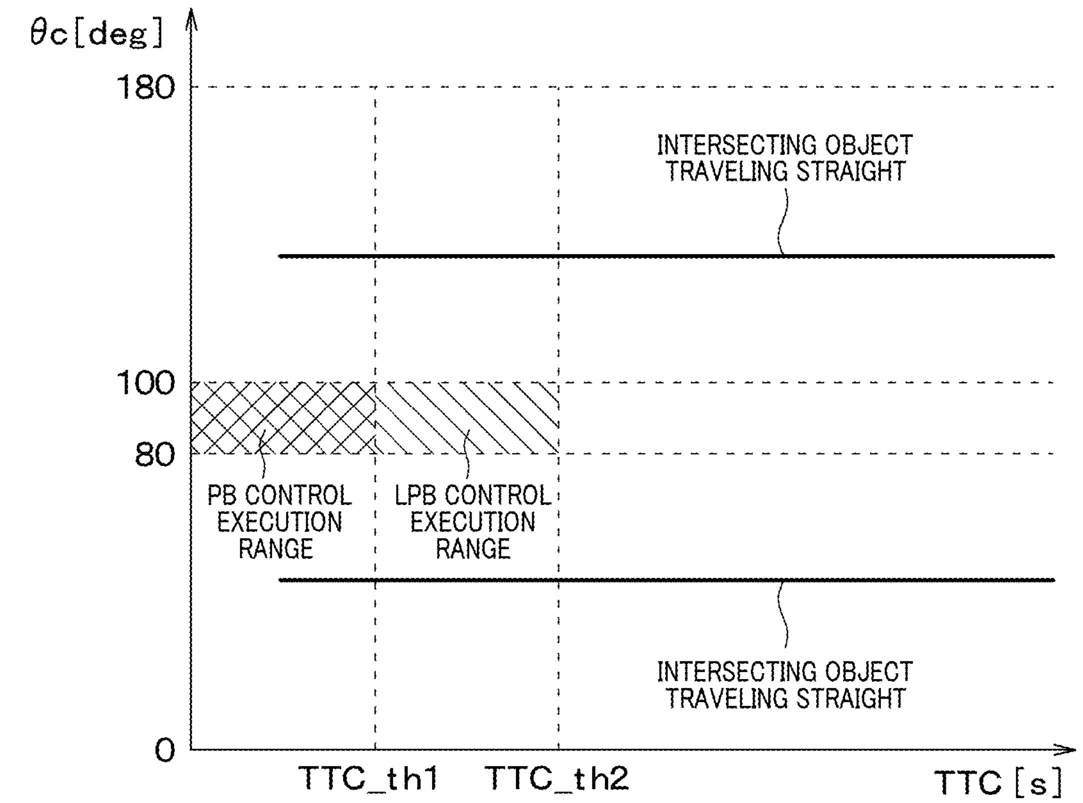
FIG. 14 is a graph showing a time to collision and an intersecting angle.

However, as shown in FIGS. 13 and 14, when the intersecting angle θc is 45° or 135°, if the intersecting vehicle approaches the own vehicle 90 from an oblique direction, the intersecting angle θc is outside the predetermined range. Hence, the driving assist apparatus 40 cannot determine whether the intersecting object travels straight or makes a left turn or a right turn. Hence, in the case where the intersecting angle θc is used, the driving assist apparatus 40 may not be able to execute the PB control and the LPB control appropriately. In FIG. 13, the trajectory of the own vehicle 90 is indicated by Om, a two-dot chain line and an arrow. The trajectory of the intersecting object is indicated by Oc, a two-dot chain line and an arrow.

The driving assist apparatus 40 utilizes a yaw rate of the intersecting object in the condition 4.

Figure 15:
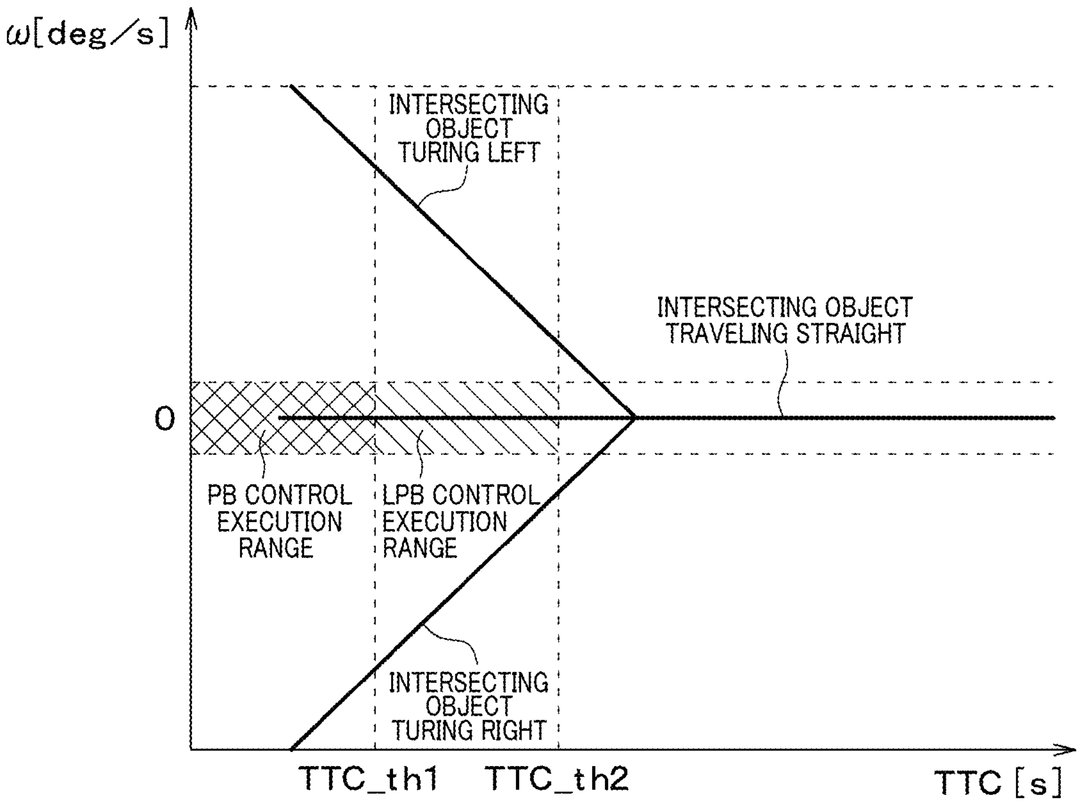
FIG. 15 is a graph showing a time to collision and a yaw rate of the intersecting object.

Here, in the case where the intersecting object travels straight, as shown in FIG. 15, the yaw rate of the intersecting object is 0 regardless of the angle of the intersecting angle θc. Further, when the intersecting object makes a left turn or a right turn, the yaw rate of the intersecting object changes. Note that the yaw rate of the intersecting object is indicated by ω in FIG. 15.

Accordingly, the driving assist apparatus 40 utilizes the yaw rate of the intersecting object in the condition 4, thereby determining whether the intersecting object travels straight or makes a left turn or a right turn. Hence, the driving assist apparatus 50 using the yaw rate of the intersecting object is able to appropriately execute the PB control and the LPB control without depending on the intersecting angle θc.

Further, the driving assist apparatus 40 according to the first embodiment obtains the following effects and advantages.

[1] The driving assist apparatus 40 executes the PB control when the intersecting object relative distance Dco is within a predetermined range.

In the case where the intersecting object relative distance Dco is within a predetermined range, probability of collision between the own vehicle 90 and the intersecting object is very high. Hence, with the above-described process, a collision between the own vehicle 90 and the moving object can be appropriately avoided.

[2] It is assumed that the yaw rate of the intersecting object is within a predetermined range and the sensor which detects the intersecting object is at least the front sensor 10 and the front camera 12. In this case, assuming that the vehicle speed of the own vehicle 90 is traveling speed threshold or higher, the yaw rate of the own vehicle 90 is less than the yaw rate threshold, and the turning radius of the own vehicle 90 is turning radius threshold or larger, the driving assist apparatus 40 executes the PB control. Further, it is assumed that the sensor that detects the intersecting object is only either the lateral left sensor 14 or the lateral right sensor 16 when the yaw rate of the intersecting object is within a predetermined range. In this case, assuming that the traveling speed of the own vehicle 90 is traveling speed threshold or higher, the yaw rate of the own vehicle 90 is less than the yaw rate threshold, and the turning radius of the own vehicle is turning radius threshold or larger, the driving assist apparatus 40 executes the LPB control. Thus, since it is limited to a case where the own vehicle 90 travels straight, a collision between the own vehicle 90 and the moving object can be appropriately avoided.

[3] The driving assist apparatus 40 executes the PB control when the time to collision TTC is less than or equal to the first time threshold TTC_th1. Further, the driving assist apparatus 40 executes the LPB braking control when the time to collision TTC is less than or equal to the second time threshold TTC_th2 which is larger than the first time threshold TTC_th1.

Thus, when executing either one of the PB control and the LPB control, a collision between the own vehicle 90 and the moving object can be appropriately avoided.

Second Embodiment

Figure 16:
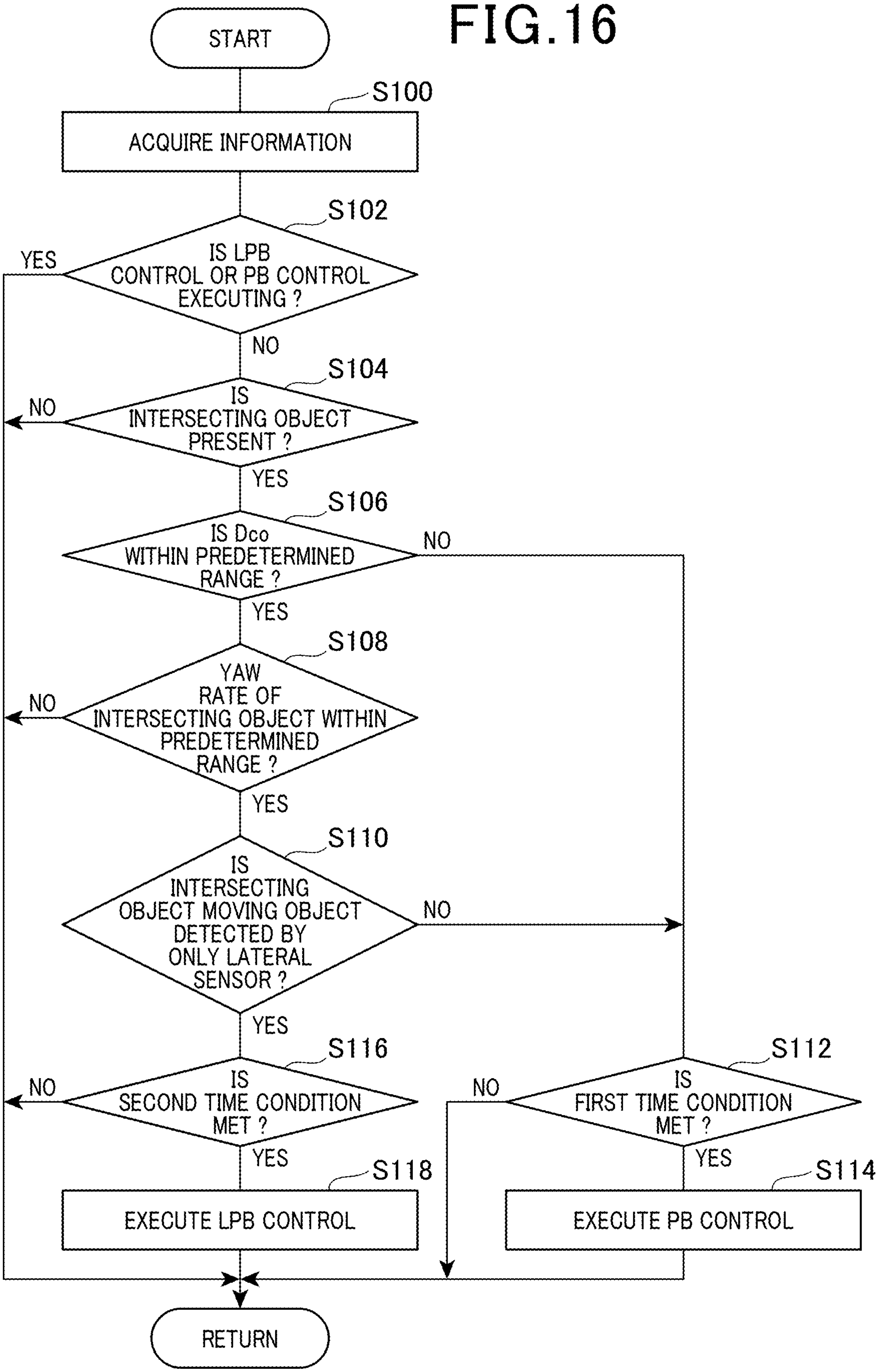
FIG. 16 is a flowchart showing processes executed by a driving assist apparatus according to a second embodiment.

According to the second embodiment, as shown in the flowchart of FIG. 16, processes of the driving assist apparatus 40 are different from those in the first embodiment. Other configurations are the same as those in the first embodiment.

Specifically, at step S108, the driving assist apparatus 40 only determines whether the above-described condition 4 is met, instead of determining whether the precondition is met.

That is, the driving assist apparatus 40 only determines whether the yaw rate of the intersecting object is within a predetermined range.

Then, in the case where the yaw rate of the intersecting object is not within the predetermined range, the process of the driving assist apparatus 40 returns to step S100. Further, in the case where the yaw rate of the intersecting object is within the predetermined range, the process of the driving assist apparatus 40 proceeds to step S110. The processes after step S110 are the same as those in the first embodiment.

The driving assist apparatus 40 according to the second embodiment performs processes as described above. Also, with the second embodiment, the same effects and advantages as those in the first embodiment can be obtained.

Other Embodiment

The present disclosure is not limited to the above-described embodiments, but appropriate modifications may be applied to the above-described embodiments. Further, in the above-described embodiments, elements constituting the embodiments are not necessarily required except that elements are clearly specified as necessary or theoretically necessary.

The acquiring unit, the assist unit and the method thereof disclosed in the present disclosure may be accomplished by a dedicated computer constituted of a processor and a memory programmed to execute one or more functions embodied by computer programs. Alternatively, the acquiring unit, the assist unit and the method thereof disclosed in the present disclosure may be accomplished by a dedicated computer provided by a processor configured of one or more dedicated hardware logic circuits. Further, the acquiring unit, the assist unit and the method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes executed by the computer, into a computer readable non-transitory tangible recording media.

According to the above-described embodiments, millimeter waves are utilized as probe waves. However, the probe waves are not limited to the millimeter waves, but may be an infrared light, ultrasonic waves and the like.

According to the above-described embodiments, the front sensor 10, the lateral left sensor 14 and the lateral right sensor 16 are configured as probing wave sensors using probe waves such as millimeter waves. However, the front sensor 10, the lateral left sensor 14 and the lateral right sensor 16 are not limited to the probing wave sensors, but may be image sensors such as cameras.

According to the above-described embodiments, the driving assist system 1 is provided with the front camera 12. However, instead of using the front camera 12, the driving assist system 1 may be provided with, other than the front sensor 10, probing wave sensors using probe waves such as millimeter waves, infrared light and ultrasonic waves.

According to the above-described embodiments, the estimation apparatus 30 calculates the yaw rate of the object using reflection waves of probe waves. However, the estimation apparatus 30 is not limited to the configuration using the reflection waves of the probe waves. For example, the estimation apparatus 30 may utilize an optical flow of the image captured by the camera to calculate the yaw rate of the object. Note that the optical flow refers to a movement vector of feature points in the image.

Aspect of the Present Disclosure

[Aspect 1]

A driving assist apparatus comprising:

an acquiring unit (S100) that acquires information obtained by a front sensor (10, 12) that detects an object existing ahead of an own vehicle (90), information obtained by a lateral sensor (14, 16) that detects an object existing in a lateral side of the own vehicle and information related to the own vehicle; and an assist unit (S108-S118) that performs a driving assist operation of the own vehicle, based on a sensor that detects an intersecting object as a moving object of which a trajectory intersects a trajectory of the own vehicle and a yaw rate of the intersecting object, wherein the assist unit is configured to execute a first braking control that brakes the own vehicle in the case where the yaw rate of the intersecting object is within a predetermined range and the sensor that detects the intersecting object is at least the front sensor; and execute a second braking control that brakes the own vehicle with a braking force smaller than that of the first braking control in the case where the yaw rate of the intersecting object is within a predetermined range and the sensor that detects the intersecting object is only the lateral sensor.

[Aspect 2]

The driving assist apparatus according to aspect 1, wherein the assist unit is configured to execute the first braking control in the case where a distance (Dco) from the own vehicle to the intersecting object with respect to a lateral direction of the own vehicle is within a predetermined range.

[Aspect 3]

The driving assist apparatus according to aspect 1 or 2, wherein the assist unit is configured to execute the first braking control in the case where a traveling speed of the own vehicle is a traveling speed threshold or higher, a yaw rate of the own vehicle is less than a yaw rate threshold, a turning radius of the own vehicle is a turning radius threshold or larger, the yaw rate of the intersecting object is within a predetermined range, and the sensor that detects the intersecting object is at least the front sensor; and execute the second braking control in the case where a traveling speed of the own vehicle is a traveling speed threshold or higher, a yaw rate of the own vehicle is less than a yaw rate threshold, a turning radius of the own vehicle is a turning radius threshold or larger, the yaw rate of the intersecting object is within a predetermined range, and the sensor that detects the intersecting object is only the lateral sensor.

[Aspect 4]

The driving assist apparatus according to any one of aspects 1 to 3, wherein the assist unit is configured to execute the first braking control in the case where a yaw rate of the intersecting object is within a predetermined range, the sensor that detects the intersecting object is at least the front sensor, and a time to collision (TTC) as a predicted time required for the own vehicle to collide with the intersecting object is less than or equal to a first time threshold (TTC_th1); and execute the second braking control in the case where a yaw rate of the intersecting object is within a predetermined range, the sensor that detects the intersecting object is only the lateral sensor, and the time to collision is less than or equal to a second time threshold (TTC_th2) larger than the first time threshold.

[Aspect 5]

A method for a driving assist operation comprising steps of:

acquiring information obtained by a front sensor (10, 12) that detects an object existing ahead of an own vehicle (90), information obtained by a lateral sensor (14, 16) that detects an object existing in a lateral side of the own vehicle and information related to the own vehicle; and performing a driving assist operation (S108-S118) of the own vehicle, based on a sensor that detects an intersecting object as a moving object of which a trajectory intersects a trajectory of the own vehicle and a yaw rate of the intersecting object, wherein executing a first braking control that brakes the own vehicle in the case where the yaw rate of the intersecting object is within a predetermined range and the sensor that detects the intersecting object is at least the front sensor; and executing a second braking control that brakes the own vehicle with a braking force smaller than that of the first braking control in the case where the yaw rate of the intersecting object is within a predetermined range and the sensor that detects the intersecting object is only the lateral sensor.

[Aspect 6]

A program for a driving assist operation, stored in a non-transitory tangible recording media, causing a computer as a driving assist apparatus to function as:

an acquiring unit (S100) that acquires information obtained by a front sensor (10, 12) that detects an object existing ahead of an own vehicle (90), information obtained by a lateral sensor (14, 16) that detects an object existing in a lateral side of the own vehicle and information related to the own vehicle; and an assist unit (S108-S118) that performs a driving assist operation of the own vehicle, based on a sensor that detects an intersecting object as a moving object of which a trajectory intersects a trajectory of the own vehicle and a yaw rate of the intersecting object, wherein the assist unit is configured to execute a first braking control that brakes the own vehicle in the case where the yaw rate of the intersecting object is within a predetermined range and the sensor that detects the intersecting object is at least the front sensor; and execute a second braking control that brakes the own vehicle with a braking force smaller than that of the first braking control in the case where the yaw rate of the intersecting object is within a predetermined range and the sensor that detects the intersecting object is only the lateral sensor.

CONCLUSION

The present disclosure provides a driving assist apparatus, a driving assist method and a program therefor, capable of avoiding a case where the driver of the own vehicle feels that a driving assist operation of the own vehicle is unnecessary.

A first aspect of the present disclosure is a driving assist apparatus including: an acquiring unit that acquires information obtained by a front sensor that detects an object existing ahead of an own vehicle, information obtained by a lateral sensor that detects an object existing in a lateral side of the own vehicle and information related to the own vehicle; and an assist unit that performs a driving assist operation of the own vehicle, based on a sensor that detects an intersecting object as a moving object of which a trajectory intersects a trajectory of the own vehicle and a yaw rate of the intersecting object, in which the assist unit is configured to execute a first braking control that brakes the own vehicle in the case where the yaw rate of the intersecting object is within a predetermined range and the sensor that detects the intersecting object is at least the front sensor; and execute a second braking control that brakes the own vehicle with a braking force smaller than that of the first braking control in the case where the yaw rate of the intersecting object is within a predetermined range and the sensor that detects the intersecting object is only the lateral sensor.

A fifth aspect of the present disclosure is a method for a driving assist operation including steps of: acquiring information obtained by a front sensor that detects an object existing ahead of an own vehicle, information obtained by a lateral sensor that detects an object existing in a lateral side of the own vehicle and information related to the own vehicle; and performing a driving assist operation of the own vehicle, based on a sensor that detects an intersecting object as a moving object of which a trajectory intersects a trajectory of the own vehicle and a yaw rate of the intersecting object, in which executing a first braking control that brakes the own vehicle in the case where the yaw rate of the intersecting object is within a predetermined range and the sensor that detects the intersecting object is at least the front sensor; and executing a second braking control that brakes the own vehicle with a braking force smaller than that of the first braking control in the case where the yaw rate of the intersecting object is within a predetermined range and the sensor that detects the intersecting object is only the lateral sensor.

A sixth aspect of the present disclosure is a program for a driving assist operation, stored in a non-transitory tangible recording media, causing a computer as a driving assist apparatus to function as: an acquiring unit that acquires information obtained by a front sensor that detects an object existing ahead of an own vehicle, information obtained by a lateral sensor that detects an object existing in a lateral side of the own vehicle and information related to the own vehicle; and an assist unit that performs a driving assist operation of the own vehicle, based on a sensor that detects an intersecting object as a moving object of which a trajectory intersects a trajectory of the own vehicle and a yaw rate of the intersecting object, in which the assist unit is configured to execute a first braking control that brakes the own vehicle in the case where the yaw rate of the intersecting object is within a predetermined range and the sensor that detects the intersecting object is at least the front sensor; and execute a second braking control that brakes the own vehicle with a braking force smaller than that of the first braking control in the case where the yaw rate of the intersecting object is within a predetermined range and the sensor that detects the intersecting object is only the lateral sensor.

In the case where the sensor that detects the intersecting object is at least the front sensor, the intersecting object is a moving object which is visibly recognizable by the driver of the own vehicle. Hence, since the driver of the own vehicle recognizes the intersecting object, the driver of the own vehicle predicts that the automatic braking control is executed. Therefore, at this moment, even when the first braking control is executed, the driver of the own vehicle is unlikely to feel that the first braking control is unnecessary. Further, in the case where the sensor that detects the intersecting object is only the lateral sensor, the intersecting object is a moving object which is visibly unrecognizable by the driver of the own vehicle. Hence, at this moment, the driver of the own vehicle does not recognize the intersecting object and does not predict that the automatic braking is executed. Hence, at this moment, a second braking control is executed with a braking force smaller than that of the first braking control, whereby the driver of the own vehicle is unlikely to feel occurrence of sudden inertia force due to the deceleration of the own vehicle. Therefore, the driver of the own vehicle is unlikely to feel that the second braking control is unnecessary. Accordingly, a case where the driver of the own vehicle feels that the driving assist is unnecessary can be suppressed.

What is claimed is:

1. A driving assist apparatus comprising:

an acquiring unit that acquires information obtained by a front sensor that detects an object existing ahead of an own vehicle, information obtained by a lateral sensor that detects an object existing in a lateral side of the own vehicle and information related to the own vehicle; and an assist unit that performs a driving assist operation of the own vehicle, based on a sensor that detects an intersecting object as a moving object of which a trajectory intersects a trajectory of the own vehicle and a yaw rate of the intersecting object, wherein the assist unit is configured to execute a first braking control that brakes the own vehicle in the case where the yaw rate of the intersecting object is within a predetermined range and the sensor that detects the intersecting object is at least the front sensor; and execute a second braking control that brakes the own vehicle with a braking force smaller than that of the first braking control in the case where the yaw rate of the intersecting object is within a predetermined range and the sensor that detects the intersecting object is only the lateral sensor.

2. The driving assist apparatus according to claim 1, wherein the assist unit is configured to execute the first braking control in the case where a distance from the own vehicle to the intersecting object with respect to a lateral direction of the own vehicle is within a predetermined range.

3. The driving assist apparatus according to claim 1, wherein the assist unit is configured to execute the first braking control in the case where a traveling speed of the own vehicle is a traveling speed threshold or higher, a yaw rate of the own vehicle is less than a yaw rate threshold, a turning radius of the own vehicle is a turning radius threshold or larger, the yaw rate of the intersecting object is within a predetermined range, and the sensor that detects the intersecting object is at least the front sensor; and execute the second braking control in the case where a traveling speed of the own vehicle is a traveling speed threshold or higher, a yaw rate of the own vehicle is less than a yaw rate threshold, a turning radius of the own vehicle is a turning radius threshold or larger, the yaw rate of the intersecting object is within a predetermined range, and the sensor that detects the intersecting object is only the lateral sensor.

4. The driving assist apparatus according to claim 1, wherein the assist unit is configured to execute the first braking control in the case where a yaw rate of the intersecting object is within a predetermined range, the sensor that detects the intersecting object is at least the front sensor, and a time to collision as a predicted time required for the own vehicle to collide with the intersecting object is less than or equal to a first time threshold; and execute the second braking control in the case where a yaw rate of the intersecting object is within a predetermined range, the sensor that detects the intersecting object is only the lateral sensor, and the time to collision is less than or equal to a second time threshold larger than the first time threshold.

5. A method for a driving assist operation comprising steps of:

acquiring information obtained by a front sensor that detects an object existing ahead of an own vehicle, information obtained by a lateral sensor that detects an object existing in a lateral side of the own vehicle and information related to the own vehicle; and performing a driving assist operation of the own vehicle, based on a sensor that detects an intersecting object as a moving object of which a trajectory intersects a trajectory of the own vehicle and a yaw rate of the intersecting object, wherein executing a first braking control that brakes the own vehicle in the case where the yaw rate of the intersecting object is within a predetermined range and the sensor that detects the intersecting object is at least the front sensor; and executing a second braking control that brakes the own vehicle with a braking force smaller than that of the first braking control in the case where the yaw rate of the intersecting object is within a predetermined range and the sensor that detects the intersecting object is only the lateral sensor.

6. A program for a driving assist operation, stored in a non-transitory tangible recording media, causing a computer as a driving assist apparatus to function as:

an acquiring unit that acquires information obtained by a front sensor that detects an object existing ahead of an own vehicle, information obtained by a lateral sensor that detects an object existing in a lateral side of the own vehicle and information related to the own vehicle; and an assist unit that performs a driving assist operation of the own vehicle, based on a sensor that detects an intersecting object as a moving object of which a trajectory intersects a trajectory of the own vehicle and a yaw rate of the intersecting object, wherein the assist unit is configured to execute a first braking control that brakes the own vehicle in the case where the yaw rate of the intersecting object is within a predetermined range and the sensor that detects the intersecting object is at least the front sensor; and execute a second braking control that brakes the own vehicle with a braking force smaller than that of the first braking control in the case where the yaw rate of the intersecting object is within a predetermined range and the sensor that detects the intersecting object is only the lateral sensor.

* * * * *